(12) United States Patent
Lyon et al.

(10) Patent No.: US 10,495,246 B2
(45) Date of Patent: Dec. 3, 2019

(54) FLUID LINE CONNECTION DEVICE AND METHOD OF OPERATION THEREOF

(71) Applicant: Hydrapak, Inc., Oakland, CA (US)

(72) Inventors: Matthew J. Lyon, Moraga, CA (US); Samuel M. Lopez, San Francisco, CA (US); Joshua A. Guyot, Deer Isle, ME (US)

(73) Assignee: Hydrapak LLC, Oakland, CA (US)

( * ) Notice: Subject to any disclaimer, the term of this patent is extended or adjusted under 35 U.S.C. 154(b) by 827 days.

(21) Appl. No.: 14/975,183

(22) Filed: Dec. 18, 2015

(65) Prior Publication Data

US 2016/0341348 A1      Nov. 24, 2016

Related U.S. Application Data

(60) Provisional application No. 62/165,585, filed on May 22, 2015.

(51) Int. Cl.

| *F16L 37/40* | (2006.01) |
|---|---|
| *F16L 37/084* | (2006.01) |
| *F16L 37/413* | (2006.01) |
| *F16L 37/38* | (2006.01) |
| *F16L 37/44* | (2006.01) |
| *F16L 37/098* | (2006.01) |

(52) U.S. Cl.
CPC ....... *F16L 37/0841* (2013.01); *F16L 37/0982* (2013.01); *F16L 37/38* (2013.01); *F16L 37/40* (2013.01); *F16L 37/413* (2013.01); *F16L 37/44* (2013.01)

(58) Field of Classification Search
CPC ....... F16L 37/0841; F16L 37/40; F16L 37/38; F16L 37/413; F16L 37/44; F16L 37/084; F16L 37/0982; F16L 37/28; F16L 29/02
USPC ....... 251/148, 100, 142, 149.1, 149.6, 149.8
See application file for complete search history.

(56) References Cited

U.S. PATENT DOCUMENTS 2,805,089 A * 9/1957 Hansen ................. F16L 37/088
                                                            285/317
4,660,803 A * 4/1987 Johnston ............ F16L 37/0985
                                                            137/533.17

FOREIGN PATENT DOCUMENTS

| DE | 4208009 A1 * | 6/1993 | .......... F16L 37/1205 |
| DE | 102010035027 A1 * | 2/2012 | ............ F16L 37/084 |
| DE | 102012112563 A1 * | 6/2013 | .............. F16L 25/01 |
| EP | 0334717 A1 * | 9/1989 | .......... F16L 37/0982 |
| FR | 2429369 A1 * | 1/1980 | .............. F16L 37/05 |

* cited by examiner

*Primary Examiner* — David Bochna
*Assistant Examiner* — James A Linford
(74) *Attorney, Agent, or Firm* — Levine Bagade Han LLP

(57) ABSTRACT

A connection device is disclosed comprising a receptor having a recess; a securing clip at least partially inside the recess and comprising a clip head and a pair of clip legs, wherein the clip head has a receiving portion, wherein a portion of each of the pair of clip legs intrudes into a channel space of the connection device when the securing clip is in an unbiased configuration; and a dial comprising a first side and a second side, wherein the dial comprises a catch, wherein the catch is configured to intrude into the receiving portion, and wherein the dial is configured to strain the securing clip into a release configuration when the dial is rotated in a first angular direction.

20 Claims, 22 Drawing Sheets

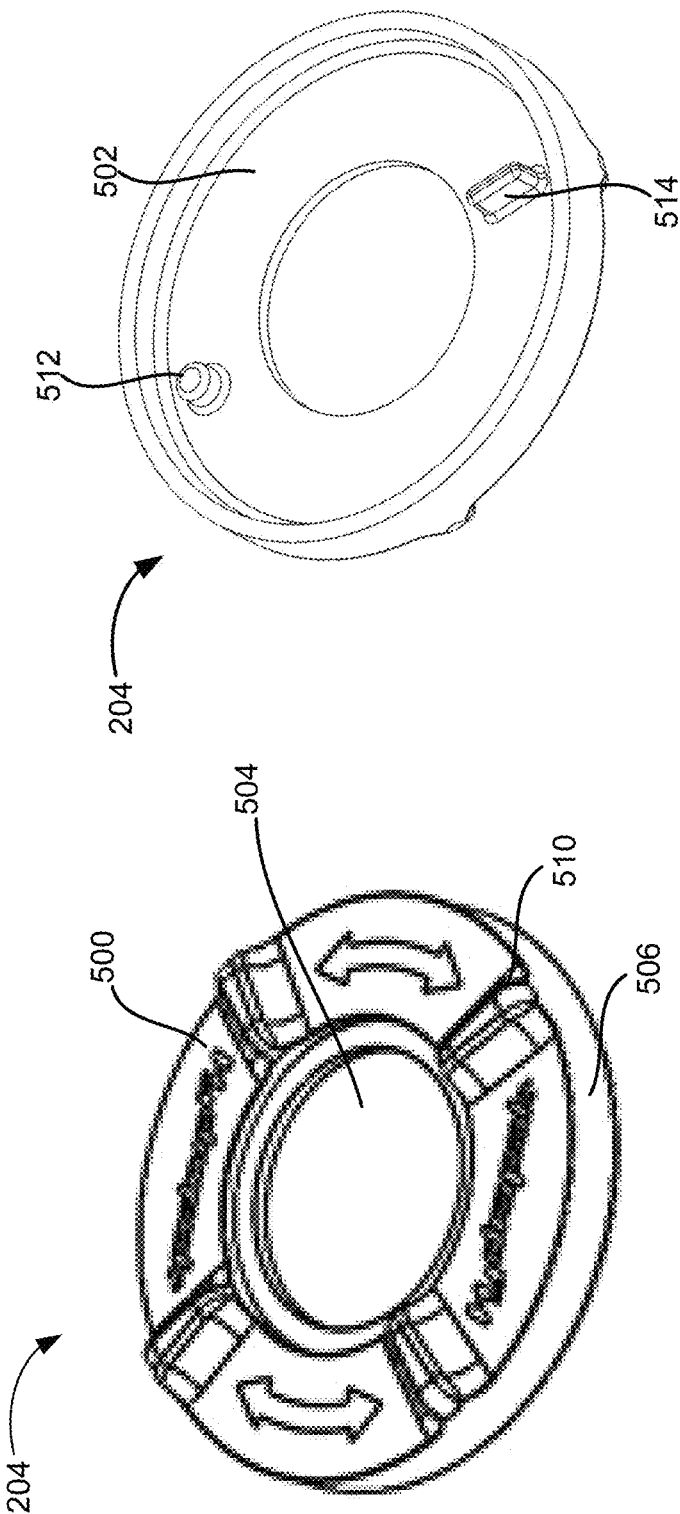

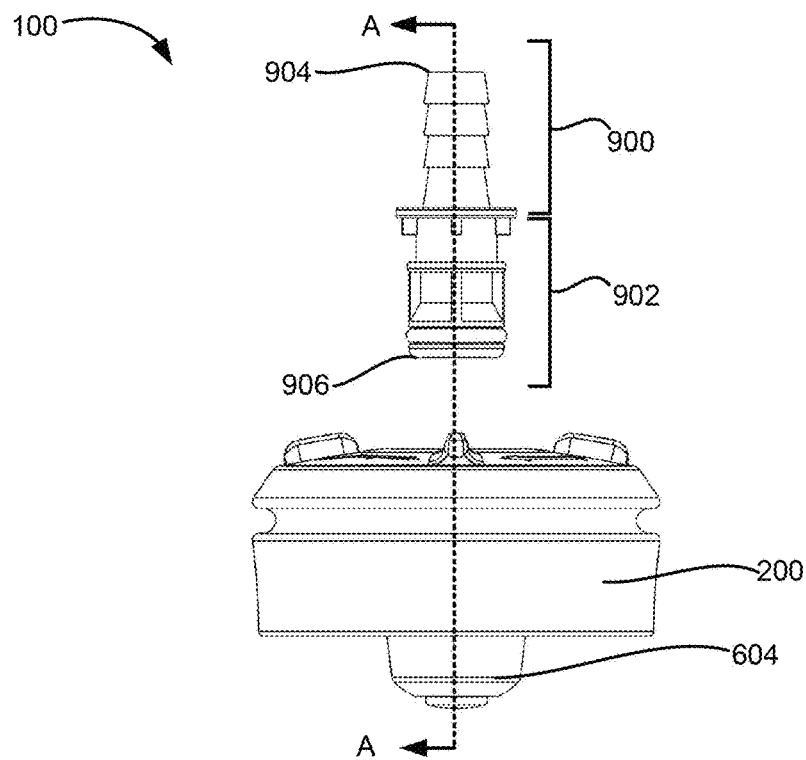
FIG. 9A
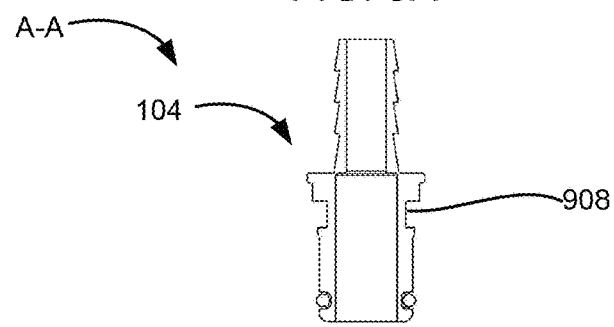
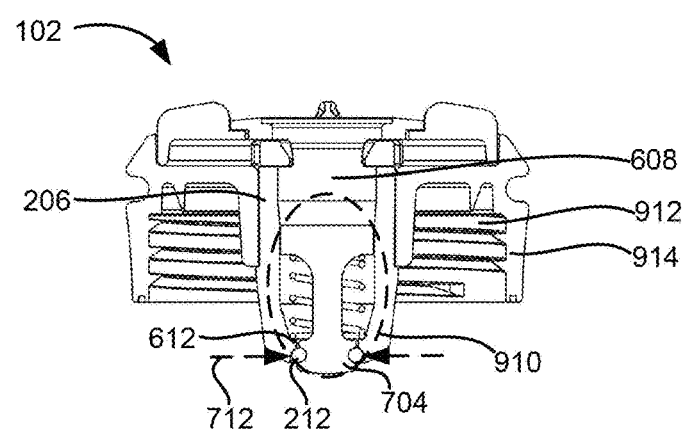
FIG. 9B

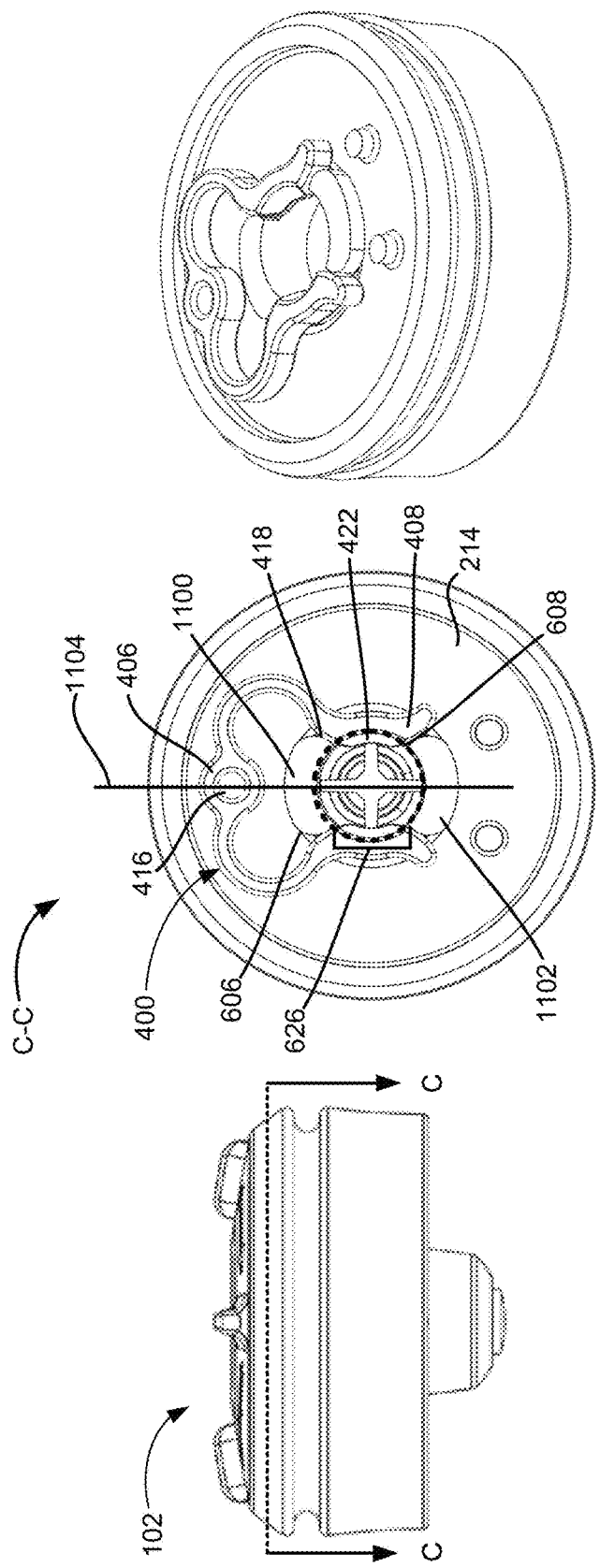

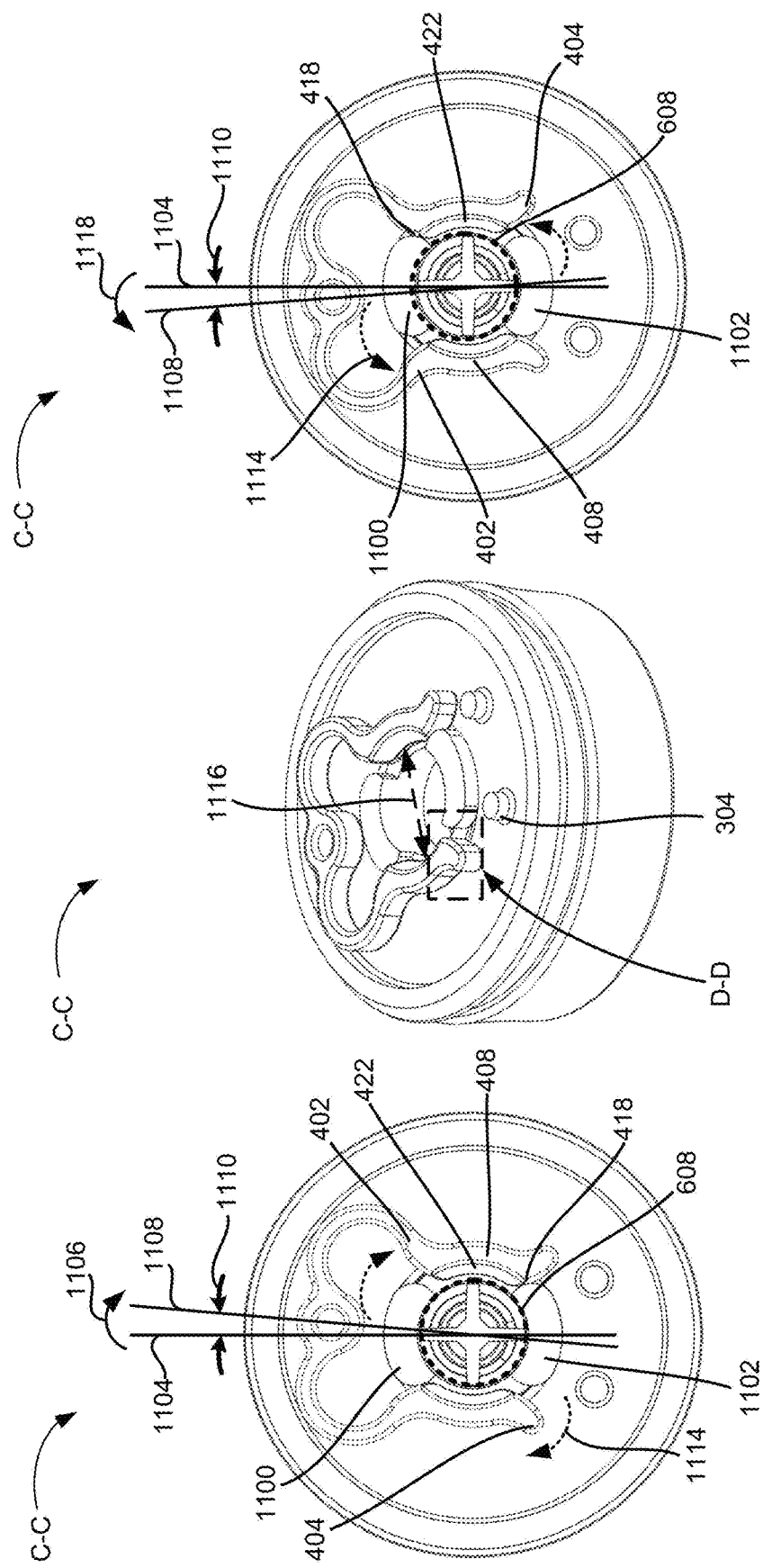

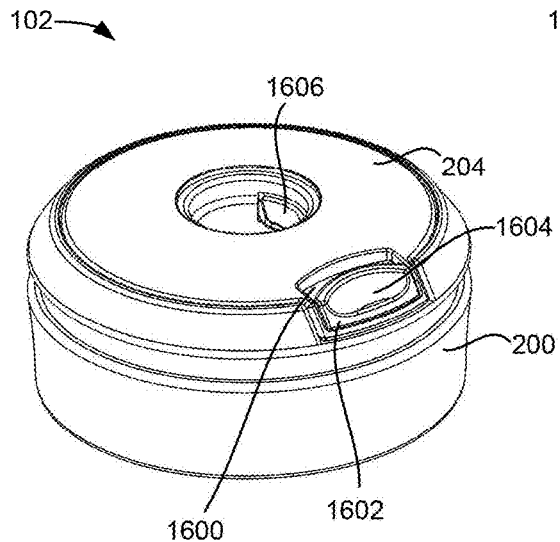
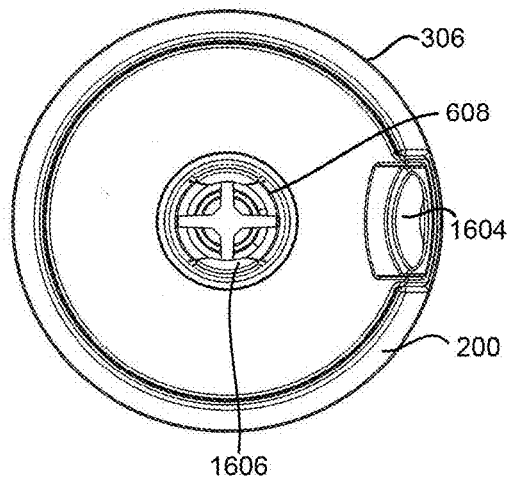
FIG. 16A          FIG. 16B
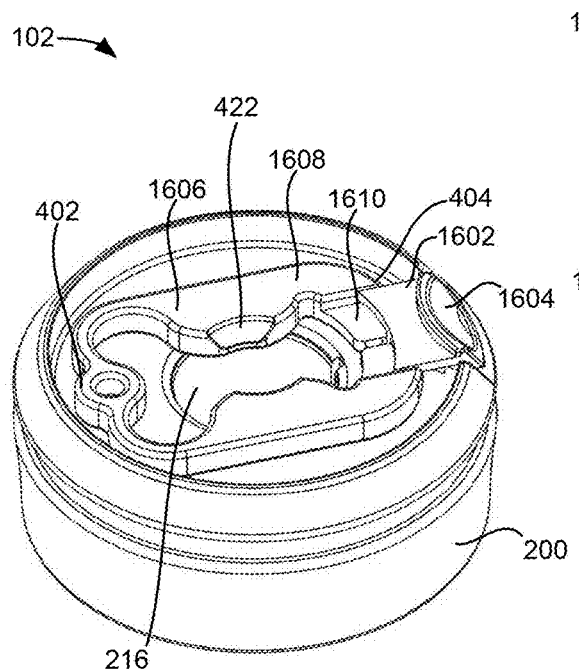
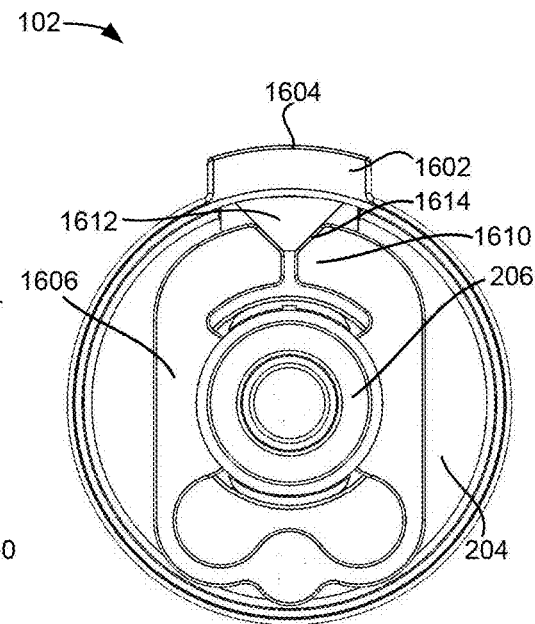
FIG. 16C          FIG. 16D

FLUID LINE CONNECTION DEVICE AND METHOD OF OPERATION THEREOF

CROSS-REFERENCE TO RELATED APPLICATIONS

The present application claims the benefit of U.S. Provisional Application No. 62/165,585, filed May 22, 2015, which is herein incorporated by reference in its entirety.

BACKGROUND

1. Field of the Technology

The present disclosure relates generally to the field of coupling mechanisms, and, more specifically, to a fluid line connection device and methods of operation thereof.

2. Related Art

Fluid line coupling mechanisms are popular for connecting a hydration tube to a hydration container or reservoir such as a water bottle or a hydration pack. For example, fluid line coupling mechanisms can be used in a recreational setting, an athletic setting, or a work setting requiring continuous or intermittent hydration. Users in such settings are often under time duress and require a fluid line coupling mechanism which is easy to operate and securely couples a fluid line to a connection device.

Existing fluid line coupling mechanisms often involve twisting a tube or tube adaptor onto a port of a container or reservoir through a threading mechanism. However, such coupling mechanisms are often slow and require excessive motion or coordination on the part of the user. In addition, such coupling mechanisms may require the user to remember which direction to twist or turn the tube or adaptor.

In addition, other existing fluid line coupling mechanisms involve a button or trigger which can be depressed or squeezed in order to release the tube or tube adaptor from an inlet port. However, such buttons or triggers often jut out or are positioned external to the coupling mechanism which makes such coupling mechanism more prone to accidental release or dislodging in outdoor or fast moving environments.

Therefore, a solution is needed that can quickly couple a fluid line to a port or inlet of a container, reservoir, or pipe without excessive coordination or attention on the part of the user. In addition, such a solution should ensure that no button or trigger protrudes radially from the coupling mechanism. Furthermore, such a solution should not be overly complex and be cost-effective to manufacture.

SUMMARY

A connection device is disclosed. The connection device can include a receptor having a recess. The connection device can include a securing clip at least partially inside the recess comprising a clip head and one or more clip legs. The clip head can have a receiving portion. In addition, a portion of each of the one or more clip legs can intrude into a channel space of the connection device when the securing clip is in an unbiased configuration. The connection device can include a dial comprising a first side and a second side.

The dial can have a catch. The catch can be configured to intrude into the receiving portion. The dial can be configured to strain the securing clip into a release configuration when the dial is rotated in a first angular direction.

The catch of the dial can protrude from the second side of the dial. The receiving portion of the clip head can face the second side of the dial. The first side of the dial can have one or more ridges. The second side of the dial can have a stop protruding from the second side. The dial can be configured to strain the securing clip into the release configuration when the dial is rotated in a second angular direction.

The dial can have a first position when the securing clip is in the unbiased configuration and a second position when the securing clip is in the release configuration. The dial can be rotated from the first position to the second position by a dial angle when the securing clip is in the release configuration. The dial angle can be between 10 degrees and 45 degrees.

The securing clip, including the clip legs, can have an inner perimeter face. The inner perimeter face can have a sloped surface. The receptor can be configured to attach to a bottle through a coupling structure. The receptor can have a bumper protruding from the recess.

The connection device can include a channel nozzle. The channel nozzle can have channel slots and a portion of each of the clip legs can intrude into the channel space through the channel slots.

The connection device can further include a poppet. The poppet can occlude an aperture of the connection device when the receptor is in an empty configuration. The connection device can include an adaptor having a grooved space. The adaptor can be secured by the securing clip when a portion of each of the clip legs intrudes into the grooved space.

A method of releasing an adaptor from a receptor is disclosed. The method can include rotating a dial of the receptor in a first angular direction. The dial can have a first side and a second side. The dial can have a catch. The method can include straining the securing clip from an unbiased configuration into a release configuration. The securing clip can be at least partially inside a recess of the receptor.

The securing clip can have one or more clip legs and a clip head having a receiving portion. The catch can be configured to intrude into the receiving portion. The method can further include retracting a portion of each of the one or more clip legs out of a grooved space of the adaptor when the securing clip is in the release configuration.

The method can include rotating the dial by a dial angle from a first position to a second position. The dial can be in the first position when the securing clip is in the unbiased configuration. The dial can be in the second position when the securing clip is in the release configuration. The dial angle can be between 10 degrees and 45 degrees.

The method can include rotating the dial by applying a force to one or more ridges protruding from the first side. The method can further include attaching the receptor to a bottle through a coupling structure. The method can include removing the adaptor from a channel space of the receptor when the securing clip is in the release configuration.

The method can include rotating the dial in a second angular direction to strain the securing clip into the release configuration. The method can include occluding an end of the receptor using a poppet when the adaptor is removed from a channel space of the receptor.

A variation of the connection device is disclosed including a receptor having a recess and a securing clip at least partially inside the recess and comprising a clip head. The clip head can have a receiving portion. The connection device can include a dial comprising a first side and a second side. The dial can have a catch and the catch can be configured to intrude into the receiving portion of the clip head. The dial can be inside the recess and the dial can be radially surrounded by the receptor. The dial can be configured to strain the securing clip into a release configuration when the dial is rotated in a first angular direction.

BRIEF DESCRIPTION OF THE DRAWINGS

FIGS. 5A and 5B illustrate a top and bottom side, respectively, of a dial of the connection device.

FIG. 9A is a side elevational view of the connection assembly in an empty configuration.

FIG. 9B is a variation of cross-section A-A of FIG. 9A.

FIG. 11A is a side view of the connection device.

FIG. 11B is a variation of cross-section C-C of FIG. 11A.

FIG. 11C is a perspective view of the connection device of FIG. 11B.

FIG. 11D is a variation of cross-section C-C of FIG. 11A in a clockwise rotational configuration.

FIG. 11E is a perspective view of the connection device of FIG. 11D.

FIG. 11F is a variation of cross-section C-C of FIG. 11A in a counterclockwise rotational configuration.

FIG. 16A is a perspective view of a variation of the connection device.

FIG. 16B is a top plan view of the connection device of FIG. 16A.

FIG. 16C is a perspective view of a variation of the connection device of FIG. 16A with the dial and channel nozzle removed.

FIG. 16D is a bottom plan view of a variation of the connection device with the receptor removed.

DETAILED DESCRIPTION

Figure 1:
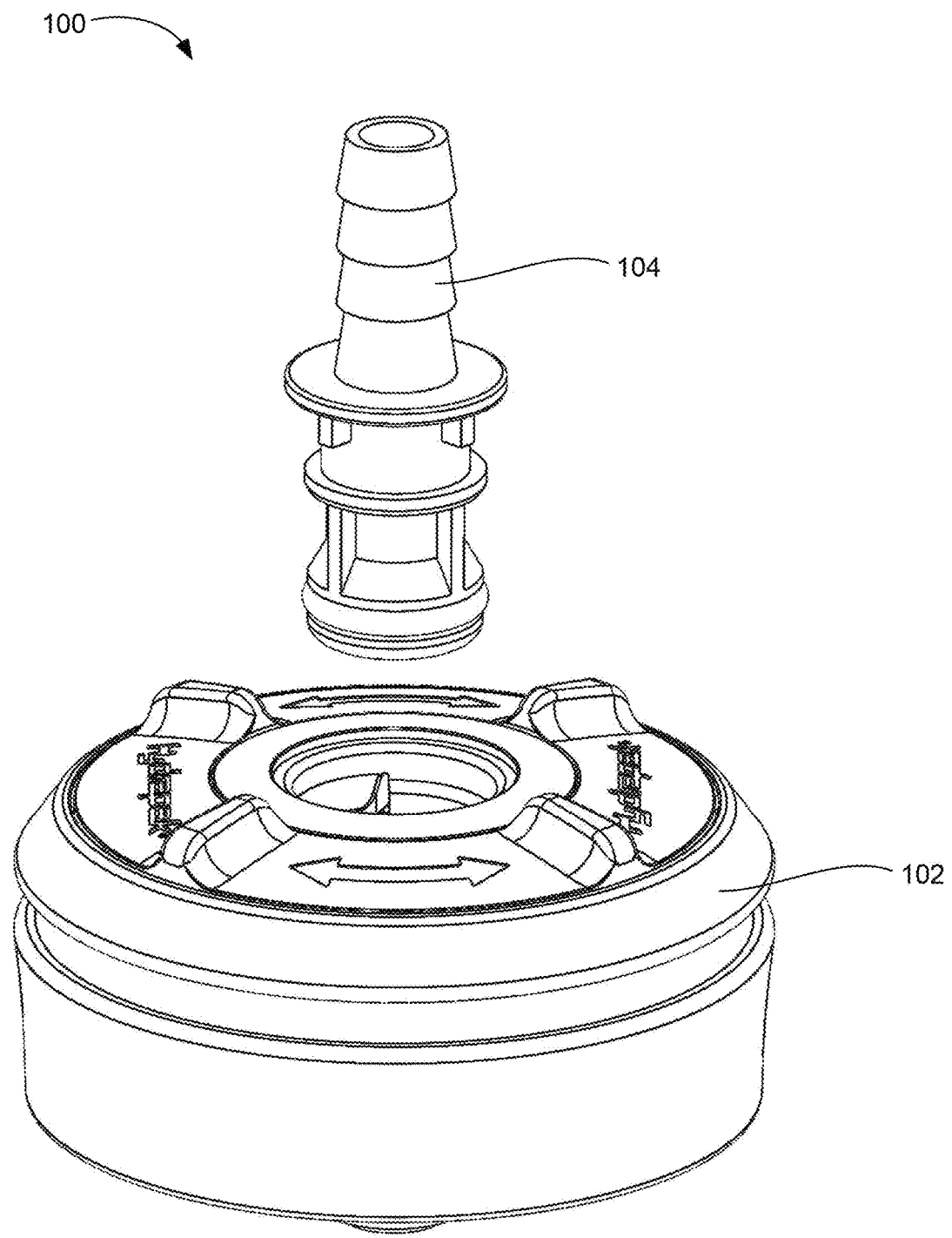
FIG. 1 illustrates a connection assembly in an empty configuration.

FIG. 1 illustrates that a connection assembly 100 can have a connection device 102 and an adaptor 104. The connection device 102 can be configured as a container lid, a cap such as a bottle cap, or a combination thereof. The connection device 102 can be configured to attach to a container lid, a cap, or a combination thereof. The connection device 102 can be configured to attach to container lids and/or caps of varying sizes and shapes. The connection device 102 can be configured to attach to a hydration pack, a fluid reservoir, or a combination thereof. The connection device 102 can be configured to attach to a pipe, a hydrant, or a combination thereof.

Figures 15A, 15B:
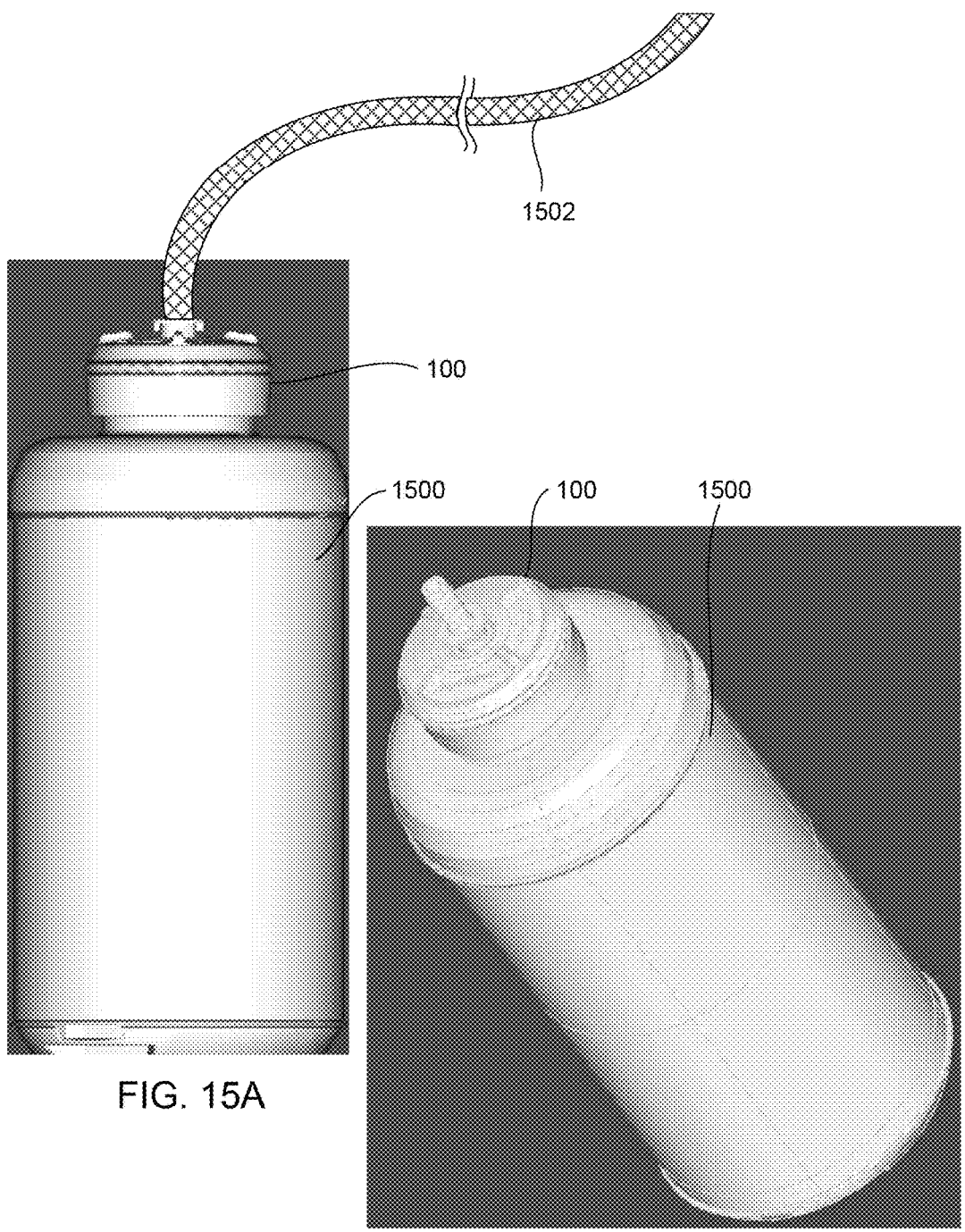
FIG. 15A is a side view of the connection assembly coupled to a fluid line and a bottle.
FIG. 15B is a perspective view of the connection assembly coupled to the bottle.

The adaptor 104 can be configured to attach to a fluid line 1502 (for example, as shown in FIG. 15A) such as a tube, a hose, a straw, or a combination thereof. The connection assembly 100 can be used to quickly couple the fluid line 1502 to a container, a cap, a hydration pack, a reservoir, a pipe, a hydrant, or a combination thereof.

Figure 2A:
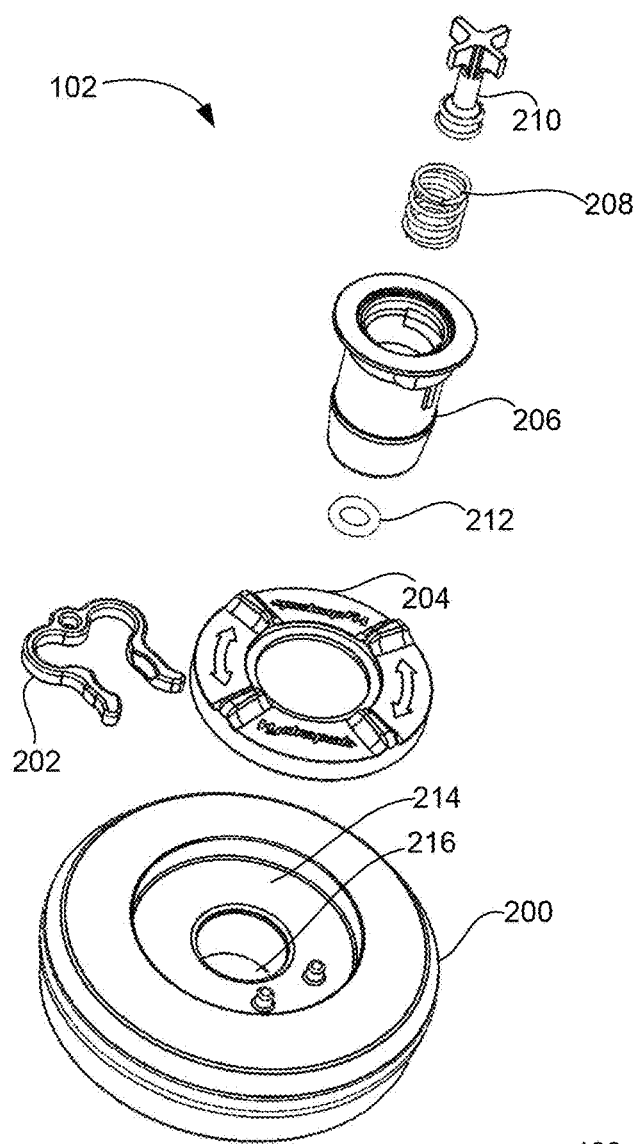
FIG. 2A is an exploded view of a connection device of the connection assembly.

FIG. 2A illustrates that the connection device 102 can have a receptor 200, a securing, clip 202, a dial 204, a channel nozzle 206, a spring 208, a poppet 210, and a sealing ring 212. The channel nozzle 206 can have a channel space 608.

The receptor 200 can have a recess 214 and a channel opening 216. The securing clip 202 can be positioned in between the receptor 200 and the dial 204.

The securing clip 202 can be partially in the recess 214. In addition, at least part of the dial 204 can be inside the recess 214.

Figure 2B:
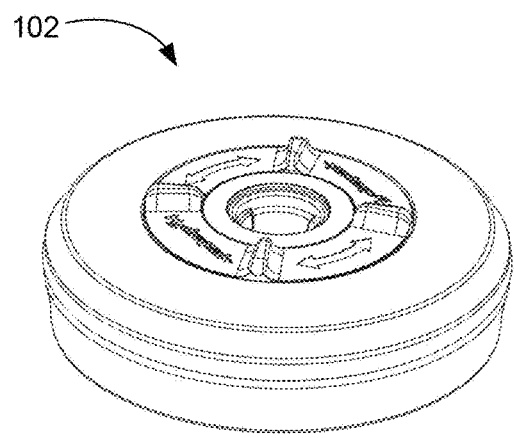
FIG. 2B illustrates the connection device of FIG. 2A in an assembled state.

FIG. 2B illustrates the connect device 102 in an assembled state. The dial 204 can fit within the recess 214 of the receptor 200 when the connection device 102 is in the assembled state. The dial 204 can cover the securing clip 202 when the connection device 102 is in the assembled state. A perimeter of the dial 204 can be surrounded by the receptor 200. A portion of the channel nozzle 206 can be located in the channel opening 216 when the connection device 102 is in the assembled state.

Figure 3:
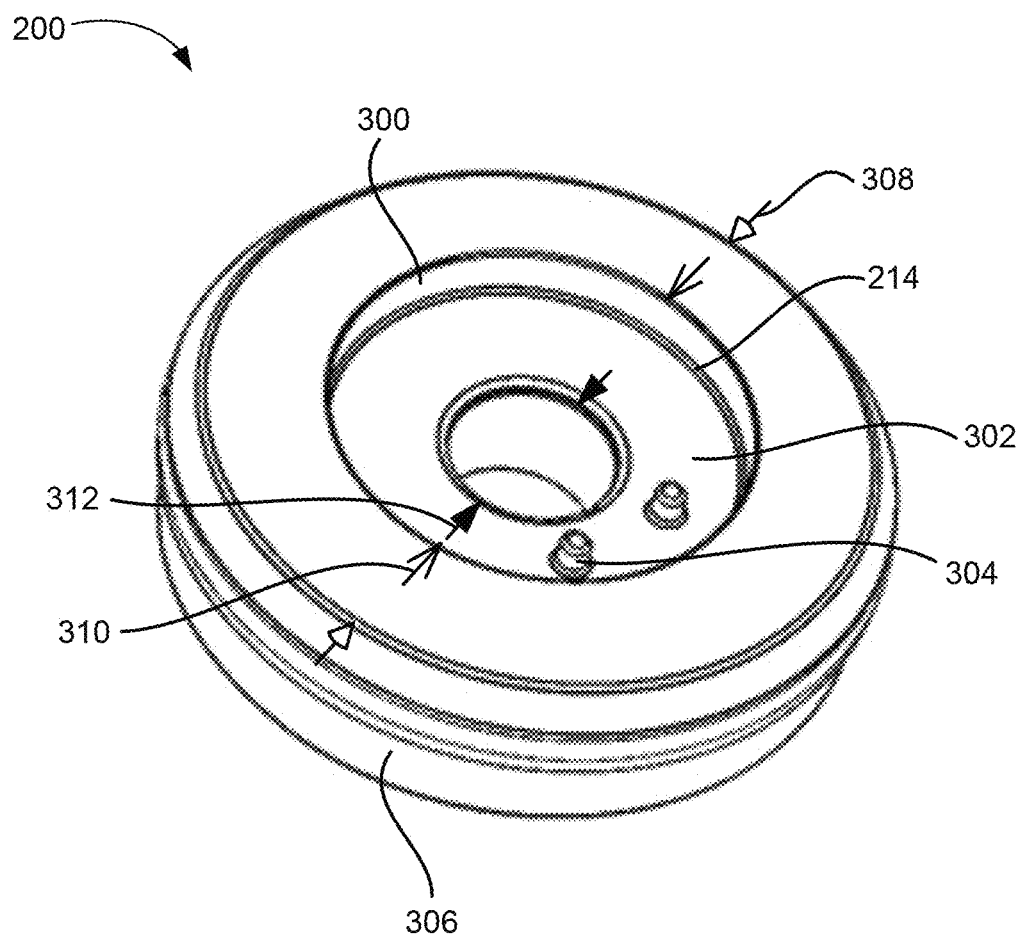
FIG. 3 illustrates a receptor of the connection device.

FIG. 3 illustrates that the recess 214 of the receptor 200 can be defined by a recessed wall 300 and a recessed floor 302. The receptor 200 can have one or more bumpers 304 protruding from the recessed floor 302.

The bumpers 304 can protrude from the recessed wall 300. The bumpers 304 can be cylindrical, cuboidal, or a combination thereof. When the receptor 200 has two or more bumpers 304, each of the bumpers 304 can be spaced apart from each of the other bumpers 304. The bumpers 304 can be spaced from the recessed wall 300.

The receptor 200 can have an outer side surface 306. The receptor 200 can have a groove, a male thread pattern, or a combination thereof circumscribing the outer side surface 306 for detachably coupling the receptor 200 to a lid, a cap, a container, a pipe, or a combination thereof. The receptor 200 can have a coupling structure 912 for detachably coupling the receptor 200 to a container, a reservoir, a pipe, or a combination thereof. For example, the coupling structure 912 can attach the receptor 200 to a neck of a bottle 1500 (for example, as shown in FIG. 15A).

The receptor 200, the recess 214, and the channel opening 216 can be substantially circular. The recess 214 can be non-circular and can be shaped as a rectangle, a square, a diamond, an oval, or a combination thereof. The channel opening 216, the recess 214, and the receptor 200 can be concentric with one another. The center of the channel opening 216 or the recess 214 can be offset from the center of the receptor 200.

The receptor 200 can have a receptor diameter 308, the recess 214 can have a recess diameter 310, and the channel opening 216 can have an opening diameter 312. The receptor diameter 308 can be greater than the recess diameter 310. In addition, both the receptor diameter 308 and the recess diameter 310 can be greater than the opening diameter 312.

The recessed wall 300 can be vertical and substantially perpendicular with the recessed floor 302. The recess 214 can be funnel-shaped and the recessed wall 300 can have a slope relative to the recessed floor 302.

Figure 4:
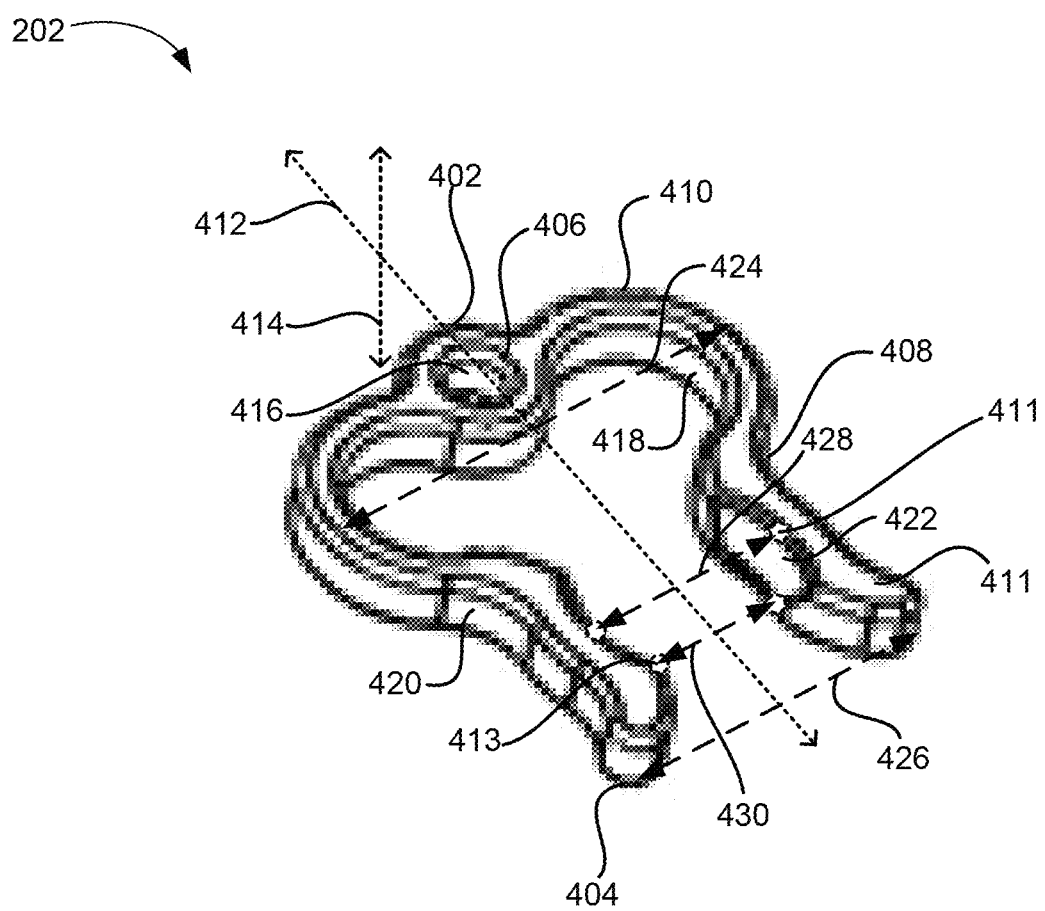
FIG. 4 illustrates a securing clip of the connection device.

FIG. 4 illustrates the securing clip 202 in an unbiased configuration. The securing clip 202 can have a clip head 406, one clip shoulder 410 or two or more clip shoulders 410, and one, one clip leg 408 or two or more clip legs 408. The securing clip 202 can have a head end 402 and a terminal end 404. The securing clip 202 can have the clip head 406 at the head end 402, the clip shoulders 410 connected to the clip head 406, and the clip legs 408 connected to the clip shoulders 410.

The securing clip 202 can have a medial axis 412 that can bisect the clip head 406. The securing clip 202 can have a depth axis 414 that can be vertical and perpendicular to the medial axis 412

The clip head 406 can be substantially circular. The clip head 406 can be rectangular, triangular, or a combination thereof. The clip head 406 can have a receiving portion 416. The receiving portion 416 can be implemented as a recess, a bore hole, a groove, an indentation, or a combination thereof. The receiving portion 416 can abut or contact an underside of the dial 204.

The securing clip 202 can have an inner perimeter face 418. The inner perimeter face 418 can be defined by an inner contour of the securing clip 202. The securing clip 202 can have an outer perimeter face 420. The outer perimeter face 420 can be defined by an outer contour of the securing clip 202.

Figure 10B:
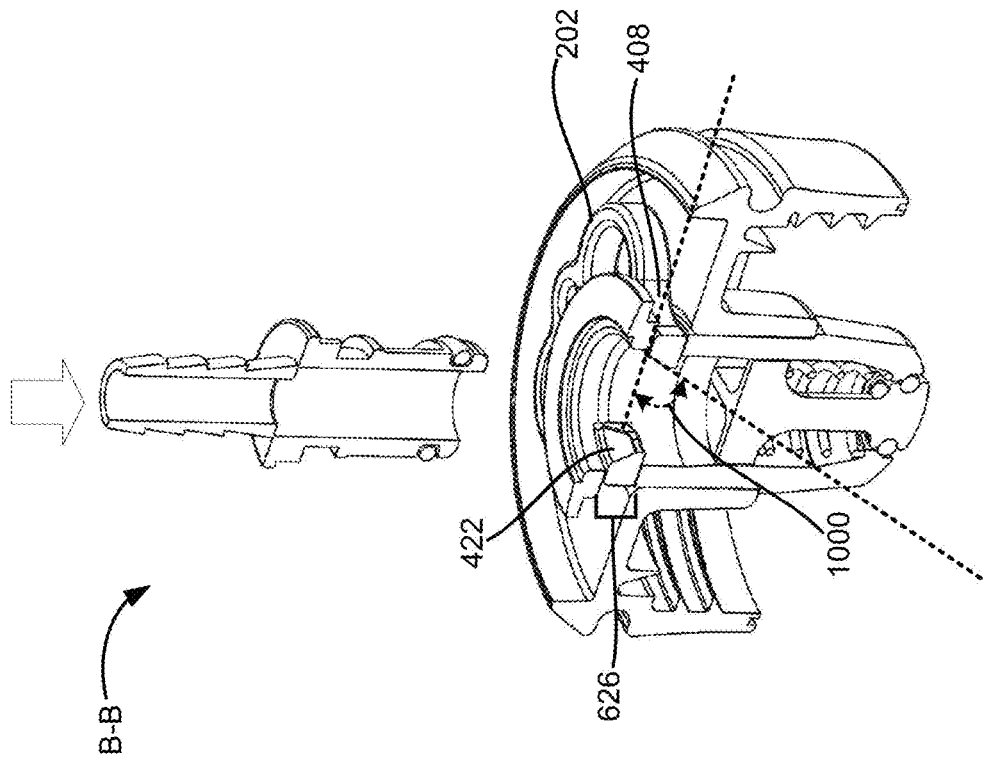
FIG. 10B is a variation of cross-section B-B of FIG. 10A in the empty configuration.

The inner perimeter face 418 and the outer perimeter face 420 can be substantially vertical. The inner perimeter face 418 and the outer perimeter face 420 can be substantially parallel with the depth axis 414. A portion of the inner perimeter face 418 along each of the clip legs 408 can have a sloped face 422 having a slope 1000 (for example, as shown in FIG. 10B) relative to the depth axis 414. The sloped face 422 can be slightly rounded. The sloped face 422 can be defined by an upward concavity as viewed along the depth axis 414. The securing clip 202 can be substantially flat. The securing clip 202 can be a wire.

The securing clip 202 can be shaped as a half dog-bone. The securing clip 202 can be shaped as a key. The securing clip 202 can be shaped as two flat condyles. The clip shoulders 410 can be rounded protuberances extending laterally away from the medial axis 412. The clip shoulders 410 can have an outer shoulder width 424. The outer shoulder width 424 can be a distance between points on the outer perimeter face 420 of the clip shoulders 410 which are laterally furthest from the medial axis 412. The outer shoulder width 424 can be about 20 mm to about 26 mm. The outer shoulder width 424 can be about 23 mm to about 25 mm. The outer should width can be about 24.85 mm.

The clip legs 408 can have a terminal leg width 426. The terminal leg width 426 can be a distance between the terminal end 404 of one of the clip legs 408 and the terminal end 404 of the other clip leg 408. The outer shoulder width 424 can be greater than the terminal leg width 426 when the securing clip 202 is in the unbiased configuration. The outer shoulder width 424 can be less than the diameter and/or length dimension of the recess 214, for example, to allow the securing clip 202 to fit within the recess 214. The securing clip 202 can lie flat on the recessed floor 302. The securing clip 202 can lie flat on the recessed floor in the unbiased configuration.

The sloped face 422 of the securing clip 202 can have upper slope midpoints 411 and lower slope endpoints 413. The upper slope midpoints 411 can be midpoints along an upper edge of the sloped face 422. The lower slope endpoints 413 can be endpoints along a lower edge of the sloped face 422.

The clip legs 408 can have a first inner leg width 428 and a second inner leg width 430. The first inner leg width 428 can be a distance between the upper slope midpoints 411. The second inner leg width 430 can be a distance between the lower slope endpoints 413.

The first inner leg width 428 can be greater than the second inner leg width 430 when the securing clip 202 is in the unbiased configuration. The difference in dimensions between the first inner leg width 428 and the second inner leg width 430 can be due to the concavity and/or the slope 1000 of the sloped face 422. In addition, each of the outer shoulder width 424 and the terminal leg width 426 can be greater than the first inner leg width 428, the second inner leg width 430, or a combination thereof.

The first inner leg width 428 can be about 8 mm to about 13 mm. The first inner leg width 428 can be about 9 mm to about 12 mm. The first inner leg width 428 can be about 11 mm. The second inner leg width 430 can be about 6 mm to about 9.5 mm. The second inner leg width 430 can be about 8 mm to about 8.5 mm. The second inner leg width 430 can be about 8.29 mm.

The securing clip 202 can be deformed by a force applied to the inner perimeter face 418 and/or the outer perimeter face 420. The securing clip 202 can be deformed from the unbiased configuration into a release configuration. The securing clip 202 can regain its shape and/or dimensions in the unbiased configuration after such deformation. For example, the securing can be composed of a polymer such as high density polyethylene (HDPE), low density polyethylene, polypropylene (LDPE), polypropylene (PP), polyethylene terephthalate (PET), or a composite thereof and/or a metal such as stainless steel.

FIGS. 5A and 5B illustrate a first side 500 and a second side 502, respectively, of the dial 204. The first side 500 can be a top side of the dial 204. The second side 502 can be a bottom side and/or an underside of the dial 204.

The dial 204 can have a dial space 504. The dial 204 can be an annular disk and the dial space 504 can be a circular shaped hollow concentric with the dial 204. The dial 204 can be rectangular, triangular, or a combination thereof. The dial space 504 can be non-circular.

The dial 204 can have a dial rim 506 surrounding the second side 502 of the dial 204. The height of the dial rim 506 can be substantially equivalent to the height of the recessed wall 300 of FIG. 3. The height of the dial rim 506 can be greater than the height of the recessed wall 300. The height of the dial rim 506 can be less than the height of the recessed wall 300. The dial 204 can be substantially flat. The dial 204 can be framed with wire.

The first side 500 of the dial 204 can have ridges 510. The ridges 510 can be implemented as protrusions extending longitudinally from the first side 500. The ridges 510 can protrude radially from the dial rim 506.

The dial 204 can have a catch 512 and a stop 514. The catch 512 and/or the stop 514 can protrude longitudinally from the second side 502 of the dial 204. The catch 512 and/or the stop 514 can protrude from an inner surface of the dial rim 506.

Where the dial 204 is an annulus, the stop 514 can be positioned on an opposite end of the annulus. The stop 514 can be positioned on a portion of the annulus rotated 180 degrees from the position of the catch 512. The stop 514 can be positioned closer to the catch 512 along the annulus.

The catch 512 can be configured to intrude into the receiving portion 416 of the securing clip 202. As such, the catch 512 can be implemented in shapes and/or dimensions capable of complementing the shapes and/or dimensions of the receiving portion 416. When the receptor 200 has two or more bumpers 304, the stop 514 can be positioned in between two of the bumpers 304 when the connection device 102 is in the assembled state.

The dial 204 can be configured to rotate in a clockwise or counterclockwise direction when a force is applied to at least one of the ridges 510. In addition, the dial 204 can be configured to strain the securing clip 202 as a result of such a rotation.

The dial 204 can be made from a polymeric material including HDPE, LDPE, PP, or PET, a ceramic material, a metallic material such as stainless steel, or a composite thereof. The dial 204 can be made of any water resistance material. The dial 204 can be made of any material safe for human contact and/or exposure.

Figure 6A:
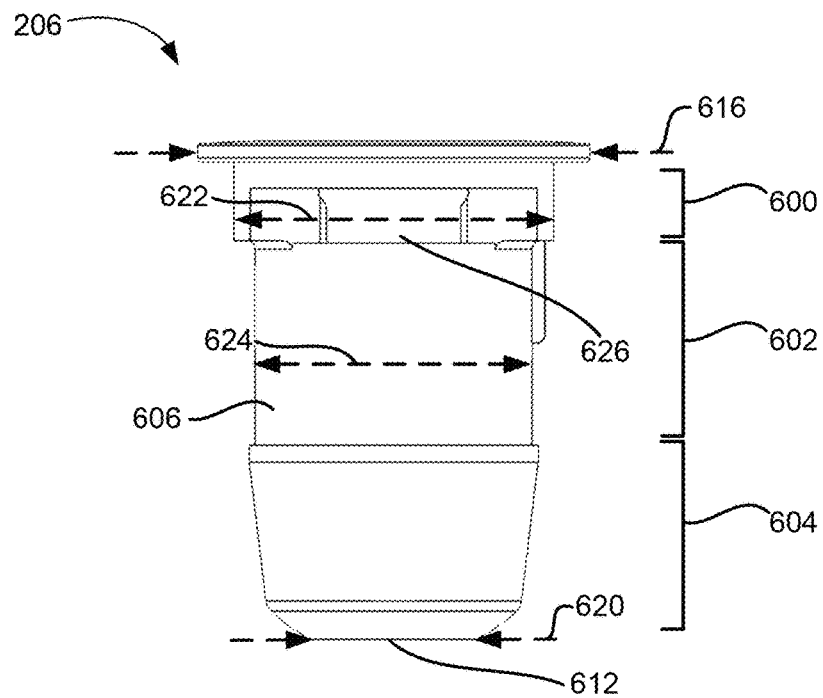
FIG. 6A is a side elevational view of a channel nozzle of the connection device.

FIG. 6A illustrates that the channel nozzle 206 can have a neck portion 600, a body portion 602, and a tapered portion 604. The body portion 602 can be substantially cylindrical and the tapered portion 604 can be substantially frusto-conical.

Figure 6B:
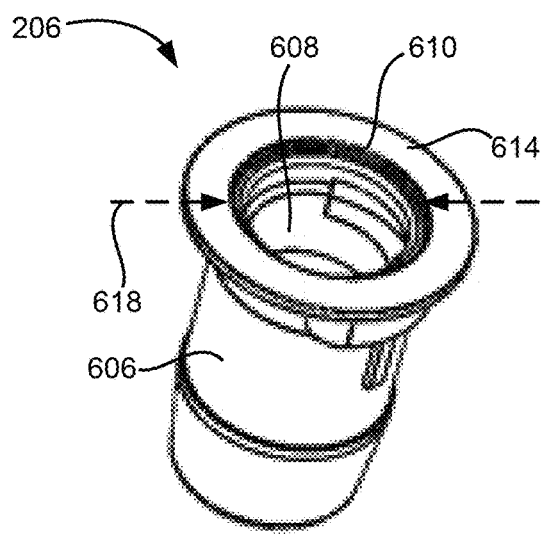
FIG. 6B is a perspective view of the channel nozzle.

FIG. 6B illustrates that the channel nozzle 206 can have a channel wall 606 surrounding a channel space 608. The channel wall 606 can extend longitudinally from the neck portion 600 to the tapered portion 604. The channel nozzle 206 can have a first aperture 610 and a second aperture 612 defining the two longitudinal ends of the channel space 608.

The neck portion 600 can be connected to a flange 614 surrounding the first aperture 610. The second aperture 612 can be surrounded by the tapered portion 604.

The flange 614 can have a flange diameter 616, the neck portion 600 can have a neck diameter 622, and the body portion 602 can have a body diameter 624. The first aperture 610 can have a first aperture diameter 618 and the second aperture 612 can have a second aperture diameter 620.

The flange diameter 616 can be greater than each of the first aperture diameter 618, the neck diameter 622, the body diameter 624, and the second aperture diameter 620. The neck diameter 622 can be greater than the body diameter 624. The body diameter 624 can be greater than the second aperture diameter 620.

The channel nozzle 206 can have channel slots 626 along the channel wall 606. The channel slots 626 can provide access to the channel space 608 along the channel wall 606. The channel slots 626 can be positioned along the neck portion 600. The channel slots 626 can be positioned along the body portion 602.

A portion of the channel nozzle 206 can extend through the dial space 504 and into the channel opening 216. The neck diameter 622 can be greater than the diameter of the channel opening 216 of the receptor 200. This difference in diameter allows the body portion 602 and the tapered portion 604 of the channel nozzle 206 to extend into and through the channel opening 216. This difference in diameter between the neck diameter 622 and the diameter of the channel opening 216 can, for example, allow a bottom surface of the neck portion 600 to rest around an inner edge of the recess 214.

The flange diameter 616 can be greater than the diameter of the dial space 504. The flange diameter 616 can be equal to the diameter of the dial space 504. This difference in diameter can prevent the channel nozzle 206 from falling through the dial space 504 and can, for example, allow a bottom side of the flange 614 to rest around the inner edge of the dial 204. The neck diameter 622 can be less than the diameter of the dial space 504.

The longitudinal height of the neck portion 600 can be greater than the thickness of the securing clip 202. As previously discussed, the thickness of the securing clip 202 can be defined by the length of the inner perimeter face 418 and/or the outer perimeter face 420. The longitudinal height of the neck portion 600 can be greater than the length of the inner perimeter face 418 and/or the outer perimeter face 420 to, for example, allow the securing clip 202 to be positioned in between the flange 614 of the channel nozzle 206 and the recessed floor 302 of the recess 214. This difference in dimensions between the height of the neck portion 600 and the thickness of the securing clip 202 can provide the securing clip 202 with clearing space to turn and/or move laterally within the recess 214.

The flange diameter 616 can be greater than the first inner leg width 428 and/or the second inner leg width 430. This difference in dimensions between the flange diameter 616 and the first inner leg width 428 and/or the second inner leg width 430 can, for example, allow the flange 614 of the channel nozzle 206 to limit the movement of the securing clip 202 along the longitudinal axis of the channel nozzle 206. This difference in dimensions can limit the movement of the securing clip 202 to a distance equal to the height of the neck portion 600 along the longitudinal axis of the channel nozzle 206. This difference in dimensions can limit the movement of the securing clip 202 to less than the height of the neck portion 600 along the longitudinal axis of the channel nozzle 206.

The channel space 608 can house the poppet 210 and the spring 208. Moreover, the channel slots 626 can provide access to the channel space 608 from a side or sides of the channel nozzle 206. A portion of each of the clip legs 408 can intrude into the channel space 608 through each of the channel slots 626.

The channel nozzle 206 can be made from a polymeric material including HDPE, LDPE, PP, PET or a combination thereof, a ceramic material, a metallic material such as stainless steel, or a composite thereof. The channel nozzle 206 can be made of any water resistance material. The channel nozzle 206 can be made of any material safe for human contact and/or exposure.

Figure 7:
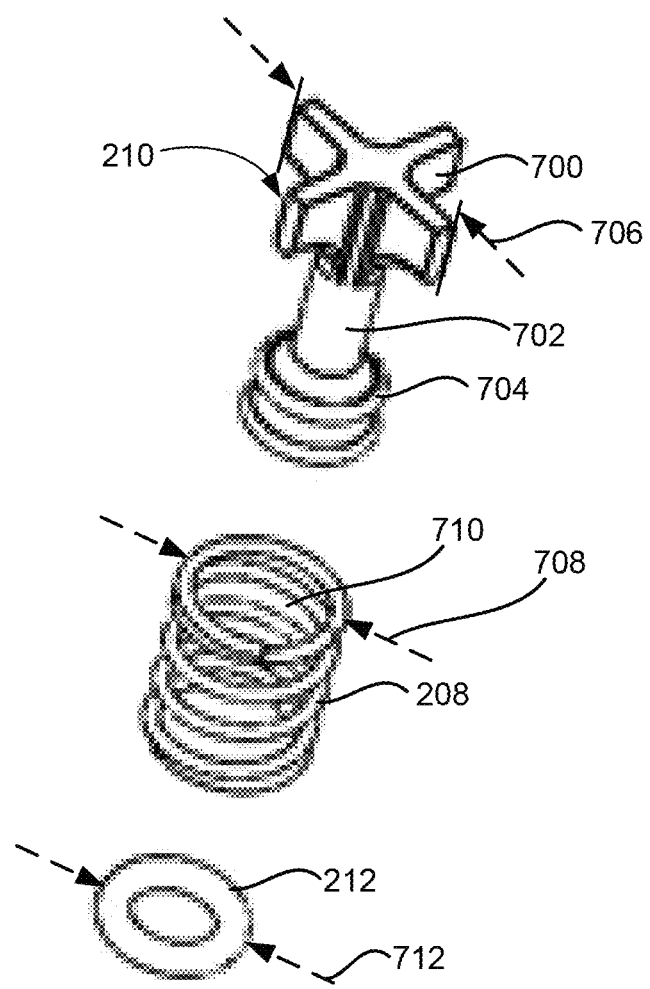
FIG. 7 is an exploded view of a poppet assembly of the connection device.

FIG. 7 illustrates that the poppet 210 can have a poppet head 700, a poppet stem 702, and a poppet plug 704. The poppet head 700 can be cross-shaped, X-shaped, or a combination thereof. The poppet head 700 can be Y-shaped, grilled, crisscrossed, or a combination thereof allowing fluid to flow past the poppet head 700.

The poppet head 700 can be connected to the poppet stem 702 on one end. The other end of the poppet stem 702 can be connected to the poppet plug 704. The poppet head 700 can have a head span 706. The head span 706 can be a width and/or radial size of the poppet head 700. The head span 706 can be a diameter when the poppet head 700 is circular and/or can be a diagonal dimension when the poppet head 700 is rectangular or cross-shaped.

The poppet 210 can be made from a polymeric material including HDPE, LDPE, PP, and/or PET, a metallic material such as stainless steel, or a composite thereof. The poppet 210 can be made of any water resistance material. The poppet 210 can be made of any material safe for human contact and/or exposure.

The spring 208 can be a coil spring substantially helical. The spring 208 can have a spring diameter 708 and a spring space 710. The spring 208 can be made of a metallic material, a polymeric material, a shape memory material, or a composite material providing the spring 208 with elasticity.

The spring space 710 can accommodate the poppet stem 702 and/or the poppet plug 704. The head span 706 can be greater than the spring diameter 708.

The poppet plug 704 can be a substantially cylindrical and/or a substantially frusto-conical shaped mass connected to the poppet stem 702. The poppet plug 704 can have an indentation, a groove, and/or a radially inward section of the poppet plug 704 configured to, for example, allow the sealing ring 212 to circumscribe the poppet plug 704. The sealing ring 212 can be substantially toroidal. The sealing ring 212 can be implemented as an O-ring, a gasket, a bumper ring, or a combination thereof. The sealing ring 212 can have an outer ring diameter 712.

The sealing ring 212 can be made of silicone, rubber, or a combination thereof. The poppet 210, the spring 208, and the sealing ring 212 can combine to form the poppet assembly 910 (for example, as shown in FIG. 9B).

Figure 8A:
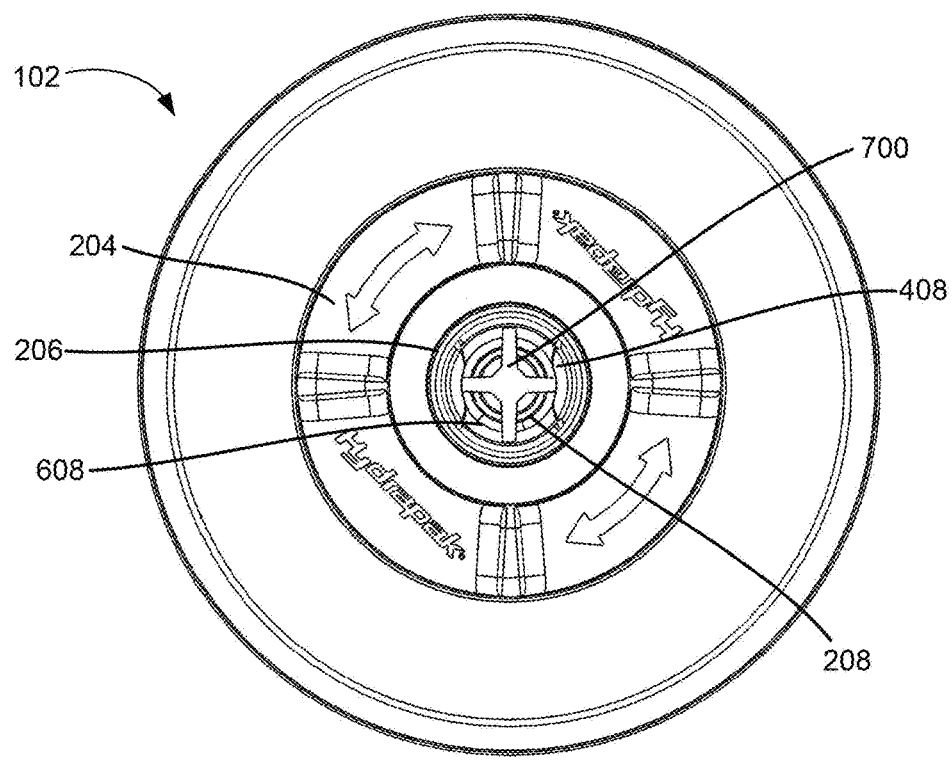
FIG. 8A is a top plan view of the connection device in an empty configuration.

FIG. 8A illustrates the connection device 102 in an empty configuration. The empty configuration can refer to the connection device 102 without the adaptor 104 coupled to the connection device 102. For example, the empty configuration can refer to the connection device 102 when no portion of the adaptor 104 is in the channel space 608.

The dial 204 can fit within the recess 214 of the receptor 200 and be surrounded by the receptor 200. The poppet head 700, the spring 208, portions of the clip legs 408, or a combination thereof can be located in the channel space 608 when the connection device 102 is in the empty configuration.

Figure 8B:
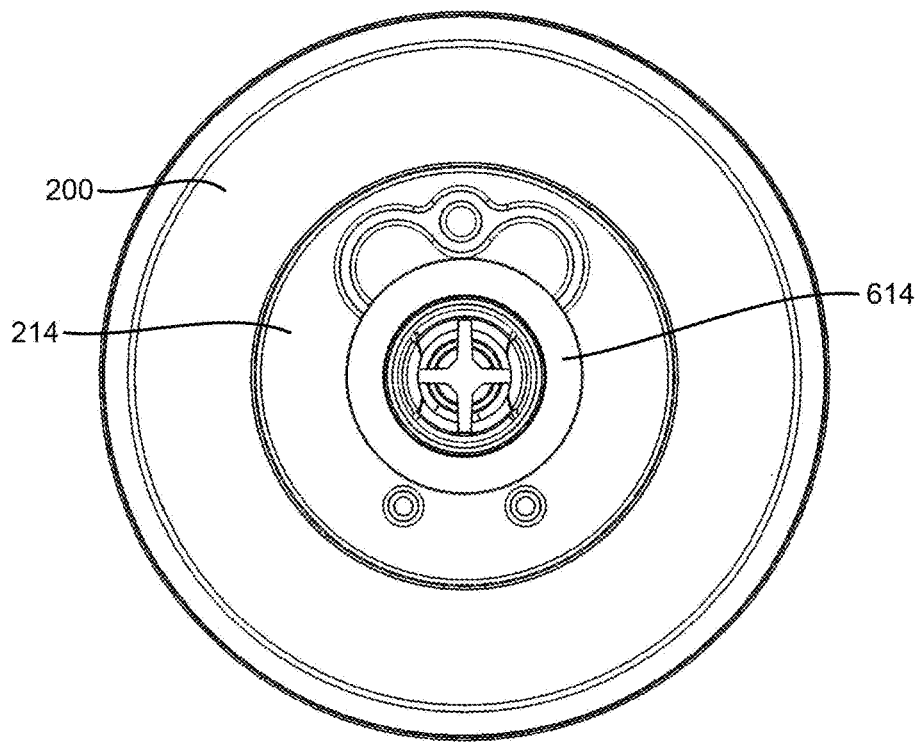
FIG. 8B is a top plan view of the connection device of FIG. 8A with the dial removed.

FIG. 8B illustrates that the securing clip 202 can be located wholly inside the recess 214. The securing clip 202 can be in the unbiased configuration when the connection device 102 is in the empty configuration. The securing clip 202 can be sandwiched and/or be positioned in between the flange 614 of the channel nozzle 206 and the recessed floor 302. The flange 614 of the channel nozzle 206 can limit the movement of the securing clip 202 in a longitudinal direction away from the recessed floor 302. By doing so, the flange 614 can prevent the securing clip 202 from being displaced from the recess 214 when the connection device 102 is flipped and/or rotated about a lateral axis.

FIG. 9A illustrates that the tapered portion 604 of the channel nozzle 206 can extend through the channel opening 216 of the receptor 200. FIG. 9A illustrates that the adaptor 104 can have a line engaging portion 900 and a receptor engaging portion 902. The line engaging portion 900 can be configured to attach to the fluid line 1502 (for example, as shown in FIG. 15A) such as a hose, a tube, a straw, a pipe, or a combination thereof. The line engaging portion 900 can have a thread pattern, a series of barbed and/or frusto-conical latching members, or a combination thereof. The line engaging portion 900 can be guided into a lumen of the fluid line 1502 to attach the fluid line 1502 to the line engaging portion 900.

The adaptor 104 can have a first adaptor end 904 and a second adaptor end 906. The first adaptor end 904 can be a terminus of the line engaging portion 900. The second adaptor end 906 can be a terminus of the receptor engaging portion 902.

FIG. 9B illustrates that the adaptor 104 can have a grooved space 908 along the receptor engaging portion 902. The grooved space 908 can be an indentation, an opening, a radially inward section of the receptor engaging portion 902, or a combination thereof. The adaptor 104 can have a sealing ring such as an O-ring, a gasket, or a combination thereof circumscribing a portion or section of the receptor engaging portion 902 proximal to the second adaptor end 906.

The adaptor 104 can be made of a polymer such as HDPE, LDPE, PP, PET, or a combination thereof, a metallic material such as stainless steel, or a composite thereof.

FIG. 9B illustrates that the poppet assembly 910 can be in the channel space 608 when the connection device 102 is in the empty configuration. The spring 208 can apply an upward force to the poppet head 700 when the spring 208 is uncompressed in the empty configuration. The poppet plug 704 and/or the sealing ring 212 of the poppet 210 can occlude the second aperture 612 of the channel nozzle 206 when the connection device 102 is in the empty configuration. The poppet plug 704 and the sealing ring 212 can occlude the second aperture 612 to prevent fluids from entering and/or leaving the channel space 608. The outer ring diameter 712 of the sealing ring 212 can be greater than to the second aperture diameter 620. The outer ring diameter 712 of the sealing ring 212 can be equal to the second aperture diameter 620. The outer ring diameter 712 of the sealing ring 212 can form a seal with the tapered portion 604 of the channel nozzle 206.

The connection device 102 can have a coupling structure 912. The coupling structure 912 can be configured to removably attach the connection device 102 to the bottle 1500 (for example, as shown in FIG. 15A). The coupling structure 912 can be configured to removably attach the connection device 102 to a pipe, a container, a bag, a pack, a fluid reservoir, or a combination thereof.

The coupling structure 912 can include a thread pattern, a locking structure, a latching structure, a plug, or a combination thereof. The coupling structure 912 can be a female thread pattern defining an inner side surface 914 of the receptor 200. The inner side surface 914 can be a surface opposite the outer side surface 306 of the receptor 200. For example, when the coupling structure 912 is the female thread pattern, the coupling structure 912 can removably attach the connection device 102 to a bottle neck of the bottle 1500 having the male thread pattern.

Figure 10A:
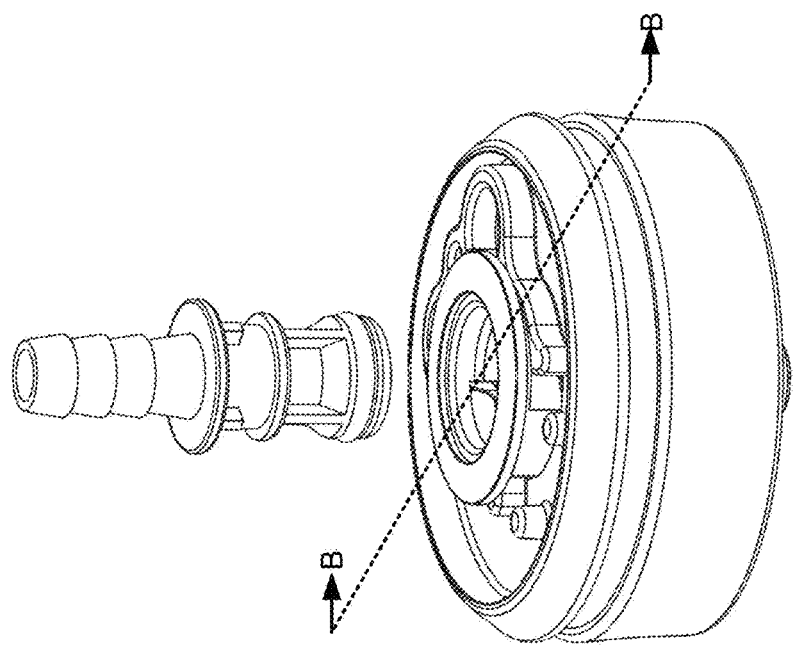
FIG. 10A is a perspective view of the connection assembly in an empty configuration with the dial removed.

FIG. 10A illustrates the connection assembly 100 with the dial 204 removed. FIG. 10B illustrates that the sloped face 422 of each of the clip legs 408 can have a slope 1000. The slope 1000 can be measured relative to a top surface of the securing clip 202. The slope 1000 can be measured relative to a transverse plane parallel to the top surface of the securing clip 202.

The slope 1000 can be about 45 degrees to about 75 degrees. The slope 1000 can be about 55 degrees to about 65 degrees. The slope 1000 can be about 60 degrees.

The securing clip 202 can intrude into the channel space 608 through the channel slots 626. For example, at least a portion of the sloped face 422 can intrude into the channel space 608 through the channel slots 626.

The securing clip 202 can be in the unbiased configuration when the clip legs 408 intrude into the channel space 608 through the channel slots 626. The securing clip 202 can be in the unbiased configuration when the connection device 102 is in the empty configuration.

The portion of the clip legs 408 intruding into the channel space 608 can be separated by the first inner leg width 428 and the second inner leg width 430. For example, the top of the sloped face 422 intruding into the channel space 608 can be separated by the first inner leg width 428 and the bottom of the sloped face 422 intruding into the channel space 608 can be separated by the second inner leg width 430.

Figure 10D:
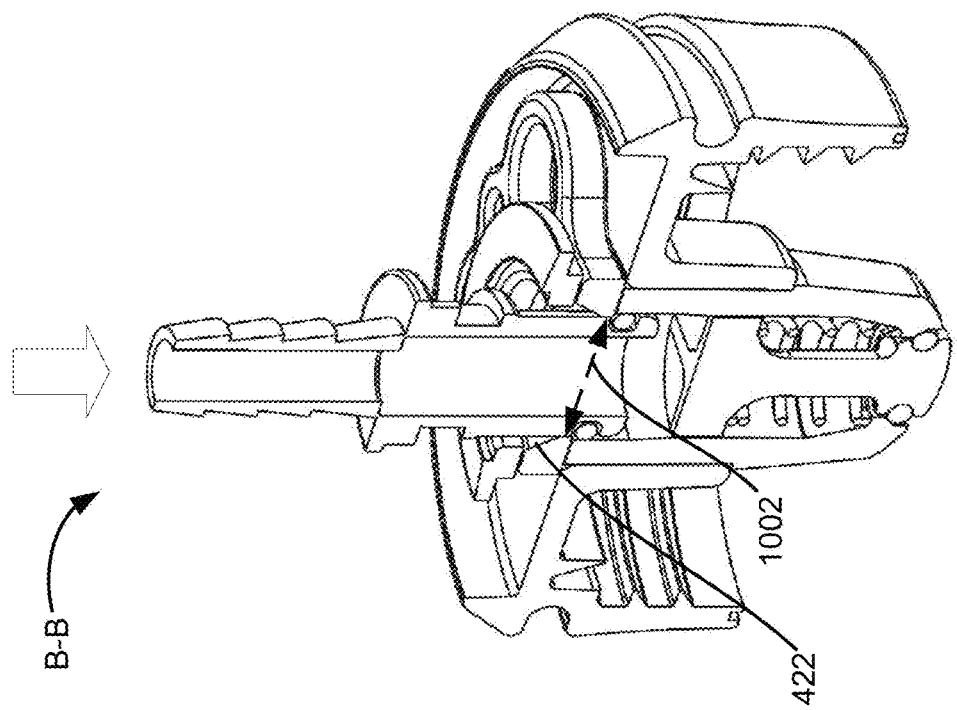
FIG. 10D is a variation of cross-section B-B of FIG. 10A in an entry configuration.
Figure 10C:
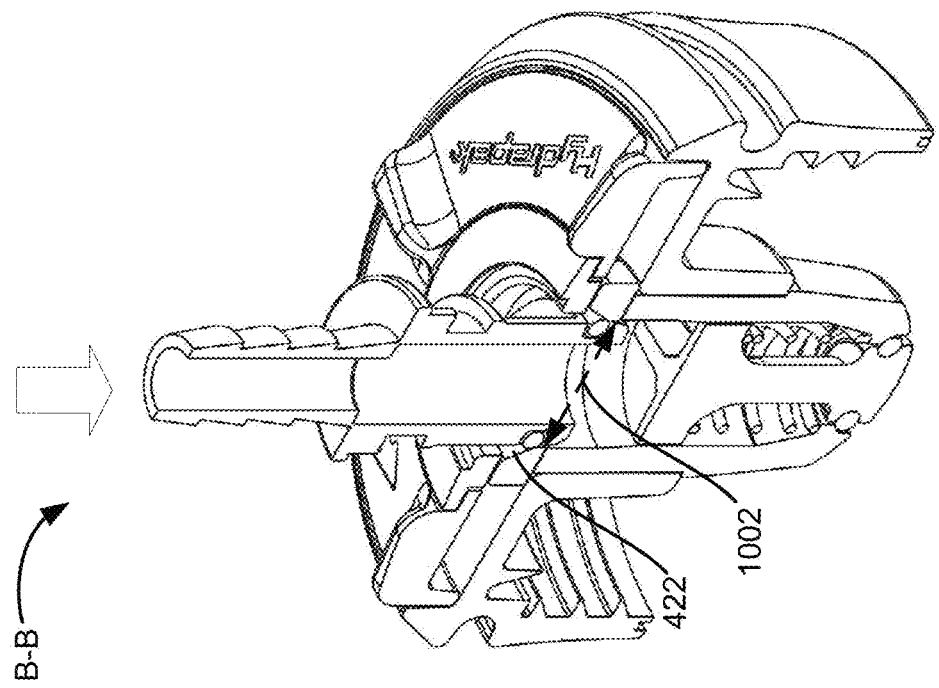
FIG. 10C is a variation of cross-section B-B of FIG. 10A in a breach configuration.

FIG. 10C illustrates the connection assembly 100 in a breach configuration. The receptor engaging portion 902 of the adaptor 104 can push aside the portions of the clip legs 408 intruding into the channel space 608 when the connection assembly 100 is in the breach configuration. The breach configuration can involve the receptor engaging portion 902 separating the clip legs 408 from the second inner leg width 430 to an entry width 1002. The entry width 1002 can be a distance equal to the diameter of the receptor engaging portion 902. The entry width 1002 can be a distance greater than the diameter of the receptor engaging portion 902.

The adaptor 104 can increase the separation between the clip legs 408 to the entry width 1002 when the gasket and/or the O-ring circumscribing the receptor engaging portion 902 makes contact with the sloped face 422 of each of the clip legs 408 and applies a radially outward force to the sloped face 422. Each of the sloped face 422 of the securing clip 202 can act as a ramp to accommodate and/or ease the entry of the adaptor 104 into the channel space 608. The sloped face 422 can prevent damage to the clip legs 408 by progressively widening the space between the clip legs 408. The sloped face 422 of the securing clip 202 can ensure that the clip legs 408 are not subject to harmful torsion and/or vertical bending when the adaptor 104 is introduced into the channel space 608.

FIG. 10D illustrates the connection assembly 100 in an entry configuration. The connection assembly 100 can be in the entry configuration when the adaptor 104 is in the channel space 608 but the second adaptor end 906 has not made contact with the poppet head 700. The clip legs 408 can be separated by the entry width 1002 when the connection assembly 100 is in the entry configuration.

Figure 10F:
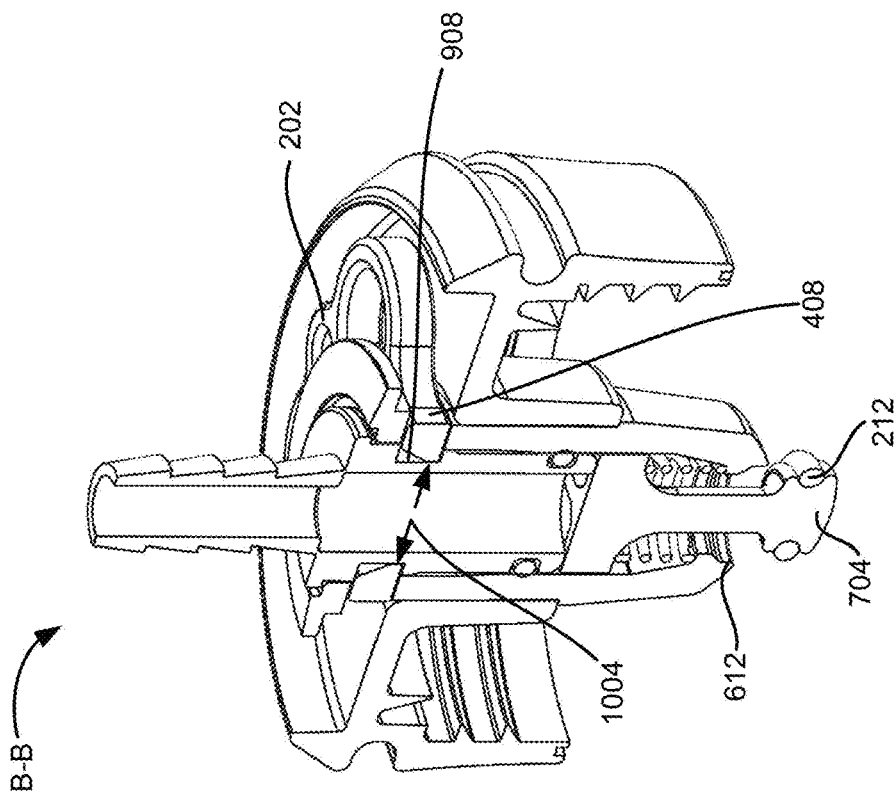
FIG. 10F is a variation of cross-section B-B of FIG. 10A in a secured configuration.
Figure 10E:
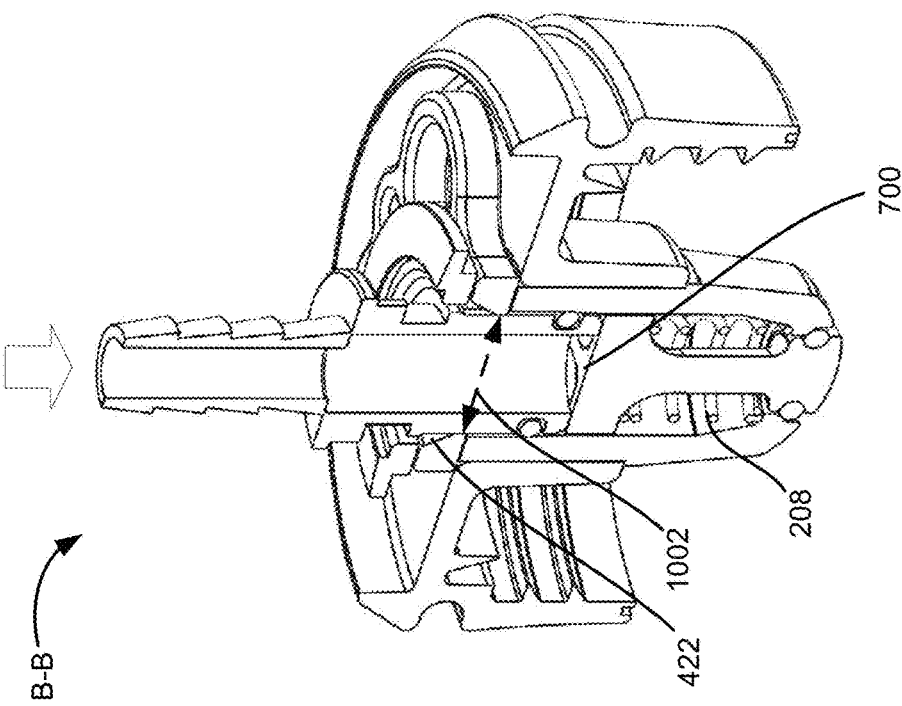
FIG. 10E is a variation of cross-section B-B of FIG. 10A in a further entry configuration.

FIG. 10E illustrates the connection assembly 100 in a further entry configuration. The connection assembly 100 can be in the further entry configuration when the second adaptor end 906 makes contact with the poppet head 700. The clip legs 408 can be separated by the entry width 1002 when the connection assembly is in the further entry configuration.

FIG. 10F illustrates the connection assembly 100 in the secured configuration. The adaptor 104 can open and/or unocclude the connection assembly 100 when the connection assembly 100 is in the secured configuration. The adaptor 104 can open and/or un-occlude the connection assembly 100 by opening and/or unblocking the second aperture 612 of the channel nozzle 206. The second adaptor end 906 can compress the spring 208 of the poppet assembly 910 when the connection assembly 100 is in the secured configuration.

The adaptor 104 can open and/or unocclude the second aperture 612 when the second adaptor end 906 compresses the spring 208 of the poppet assembly 910. The adaptor 104 can open and/or un-occlude the second aperture 612 by depressing the poppet head 700 toward the second aperture 612 and displacing the poppet plug 704 and/or the sealing ring 212 from the second aperture 612.

The adaptor 104 can displace the poppet plug 704 and the sealing ring 212 longitudinally away from the second aperture 612. The adaptor 104 can, for example, allow fluid to flow into the channel nozzle 206 when the poppet plug 704 and the sealing ring 212 are displaced from the second aperture 612. The adaptor 104 can, for example, allow fluid to flow out of the channel nozzle 206 when the poppet plug 704 and the sealing ring 212 are displaced from the second aperture 612. By displacing the poppet plug 704 and the sealing ring 212 from the second aperture 612, the adaptor 104 can, for example, allow bi-directional flow of fluid through the second aperture 612.

The adaptor 104 can be coupled to the connection device 102 when the adaptor 104 is secured by the securing clip 202. The adaptor 104 can be secured by the securing clip 202 when a portion of each of the clip legs 408 intrudes into the grooved space 908 along the receptor engaging portion 902. At least a portion of the clip legs 408 can intrude into the grooved space 908 through the channel slots 626.

The clip legs 408 can be separated by a securing width 1004 when the portion of each of the clip legs 408 intrudes into the grooved space 908. The securing width 1004 can be a distance separating the clip legs 408 when a portion of the sloped face 422 of each of the clip legs 408 intrudes into the grooved space 908. For example, the securing width 1004 can be the distance separating the lower slope endpoints 413 when the sloped face 422 intrudes into the grooved space 908. The securing width 1004 can be equal to the second inner leg width 430. The securing width 1004 can be greater than the second inner leg width 430 but less than the entry width 1002.

The securing width 1004 can be less than the diameter of the receptor engaging portion 902 of the adaptor 104. This difference in dimensions allows the securing clip 202 to secure the adaptor 104 by preventing the adaptor 104 from being retrieved longitudinally out of the channel space 608. Once the securing clip 202 is secured by the adaptor 104, the securing clip 202 can limit the range of motion of the adaptor 104 in a longitudinal direction. The securing clip 202 can, for example, permit the adaptor 104 to rotate angularly and/or circumferentially within the channel space 608. The receptor engaging portion 902 can have ridges, protrusions, or a combination thereof which prevent the angular range of motion of the adaptor 104 within the channel space 608. For example, the adaptor 104 can have ridges, walls, barriers, or a combination thereof extending radially from the surface of the adaptor 104 configured to impede the angular rotation of the adaptor 104.

In addition, the connection assembly 100 can emit a sound such as a clicking sound when the securing clip 202 is secured by the adaptor 104. The connection assembly 100 can emit the sound when the inner perimeter face 418 of the securing clip 202 makes contact with a surface of the grooved space 908 once the clip legs 408 transition from the entry width 1002 to the securing width 1004.

FIG. 11A illustrates a side of the connection device 102. FIG. 11B illustrates the securing clip 202 in the unbiased configuration. At least a portion of each of the clip legs 408 can intrude into the channel space 608 when the securing clip 202 is in the unbiased configuration. The securing clip 202 can intrude into the channel space 608 through the channel slots 626. The sloped face 422 of each of the clip legs 408 can intrude into the channel space 608 through the channel slots 626.

Portions of the inner perimeter face 418 can abut and/or adjoin the channel wall 606 of the channel nozzle 206 when the securing clip 202 intrudes into the channel space 608. The channel wall 606 can have a proximal wall 1100 and a distal wall 1102. The proximal wall 1100 can be a section and/or portion of the channel wall 606 proximal to the clip head 406 of the securing clip 202. The distal wall 1102 can be a section and/or portion of the channel wall 606 distal to the clip head 406. The proximal wall 1100 and the distal wall 1102 can be two connected halves of the channel nozzle 206 surrounding the channel space 608. The channel slots 626 can be partially defined by the proximal wall 1100 and the distal wall 1102.

The securing clip 202 can be in the unbiased configuration when the connection device 102 is in the empty configuration. In addition, the securing clip 202 can be in the unbiased configuration when the connection assembly 100 is in the secured configuration. For example, the securing clip 202 can be in the unbiased configuration when the clip legs 408 intrude into both the channel space 608 and the grooved space 908 to secure the adaptor 104.

Although not shown in FIG. 11B, the dial 204 of the connection device 102 can be positioned inside the recess 214 and cover the securing clip 202. The catch 512 of the dial 204 can intrude into the receiving portion 416 of the clip head 406 when the securing clip 202 is in the unbiased configuration.

The dial 204 can be in a first position 1104 when the connection assembly 100 is in the empty configuration, the secured configuration, or a combination thereof. The first position 1104 can refer to a position of the dial 204 when the catch 512 intrudes into the receiving portion 416 while the securing clip 202 is in the unbiased configuration. The first position 1104 can refer to a location of the catch 512 when the catch 512 intrudes into the receiving portion 416 while the securing clip 202 is in the unbiased configuration. The first position 1104 can refer to a position on the dial 204 other than the catch 512 such as one of the ridges 510 of FIG. 5A or the stop 514 of FIG. 5B.

FIG. 11C is a perspective view of the connection device 102 of FIG. 11B. FIG. 11D illustrates the connection device 102 in a clockwise rotational configuration. The clockwise rotational configuration can refer to the connection device 102 when the dial 204 is rotated in a first angular direction 1106. The first angular direction 1106 can be a clockwise direction. As previously discussed, the dial 204 can be rotated when a force is applied to one of the ridges 510 of the dial 204. For example, the dial 204 can be rotated when a user turns the dial 204 with the user's fingers and/or other appendage.

The dial 204 can be rotated from the first position 1104 to a second position 1108 by a dial angle 1110. The second position 1108 can refer to a position of the dial 204 when the dial 204 has been rotated by the dial angle 1110. The dial angle 1110 can be about 10 degrees to about 45 degrees. The dial angle 1110 can be about 15 degrees to about 25 degrees. The dial angle 1110 can be about 18 degrees to about 23 degrees. The dial angle 1110 can be about 20 degrees.

The dial 204 can strain the securing clip 202 from the unbiased configuration to a release configuration when the dial 204 is rotated from the first position 1104 to the second position 1108.

The dial 204 can be rotated until the stop 514 on the second side 502 of the dial 204 contacts one of the bumpers 304. The bumpers 304 can be used to determine the second position 1108. The bumpers 304 can be used to prevent a user from over-turning the dial 204 and damaging the securing clip 202.

The release configuration can refer to a state of deformation of the securing clip 202 which results in the securing clip 202 retracting the clip legs 408 from a portion of the channel space 608. The release configuration can refer to a state of deformation of the securing clip 202 which results in the securing clip 202 retracting the clip legs 408 from the grooved space 908. For example, the release configuration can refer to the securing clip 202 retracting the sloped face 422 of each of the clip legs 408 from the grooved space 908, the channel space 608, or a combination thereof.

The dial 204 can strain the securing clip 202 into the release configuration when the catch 512 of the dial 204 applies a rotational force to the receiving portion 416 of the clip head 406 and rotates the securing clip 202 in the first angular direction 1106. For example, the first angular direction 1106 can be a clockwise direction.

The ensuing clockwise rotation of the securing clip 202 can cause the inner perimeter face 418 of the clip legs 408 to contact the proximal wall 1100 and the distal wall 1102. The securing clip 202 can be strained into the release configuration through a series of pivot motions 1114 involving the channel wall 606.

For example, the dial 204 can be rotated in the first angular direction 1106 and the proximal wall 1100 can act as a fulcrum to pivot the terminal end 404 of one of the clip legs 408 away from the distal wall 1102. As a more specific example, the terminal end of the clip leg 408 can be pivoted away from the distal wall 1102 in a clockwise direction. By doing so, the portion of the clip leg 408 intruding into the channel space 608 and/or the grooved space 908 can be retracted out of the channel space 608 and/or the grooved space 908.

Moreover, when the dial 204 is rotated in the first angular direction 1106, the distal wall 1102 can act as a fulcrum to pivot the head end 402 of the other clip leg 408 away from the proximal wall 1100. As a more specific example, the head end 402 of the other clip leg 408 can be pivoted away from the proximal wall 1100 in a clockwise direction. By doing so, the portion of the other clip leg 408 intruding into the channel space 608 and/or the grooved space 908 can be retracted out of the channel space 608 and/or the grooved space 908.

FIG. 11E illustrates a release width 1116 between the clip legs 408. The release width 1116 can be equal to the entry width 1002 of FIG. 10C when the securing clip 202 is in the release configuration. The release width 1116 can be greater than the entry width 1002 of FIG. 10C when the securing clip 202 is in the release configuration. The release width 1116 can refer to the distance between the lower slope endpoints 413 when the securing clip 202 is in the release configuration. The release width 1116 can be greater than the diameter of the receptor engaging portion 902 to, for example, allow the adaptor 104 to exit the channel space 608.

The adaptor 104 can be removed when the securing clip 202 is strained from the unbiased configuration to the release configuration. The adaptor 104 can be removed by retracting the adaptor 104 longitudinally out of the channel space 608 when the dial 204 is rotated from the first position 1104 to the second position 1108.

FIG. 11F illustrates the connection device 102 in a counterclockwise rotational configuration. The connection device 102 can be in a counterclockwise rotational configuration when the dial is rotated from the first position 1104 to the second position 1108 in a second angular direction 1118. The second angular direction 1118 can be a counterclockwise direction.

Rotating the dial 204 in the second angular direction 1118 can cause the securing clip 202 to rotate in the counterclockwise direction. The ensuing counterclockwise rotation of the securing clip 202 can cause the inner perimeter face 418 of the clip legs 408 to contact the proximal wall 1100 and the distal wall 1102.

The securing clip 202 can be strained into the release configuration through another series of pivot motions 1114 involving the channel wall 606. For example, the proximal wall 1100 can act as a pivot to rotate the terminal end 404 of one of the clip legs 408 away from the distal wall 1102 in a counterclockwise direction. By doing so, the portion of the clip leg 408 intruding into the channel space 608 and/or the grooved space 908 can be retracted out of the channel space 608 and/or the grooved space 908.

The distal wall 1102 can act as a pivot to rotate the head end 402 of the other clip leg 408 away from the proximal wall 1100 in a counterclockwise direction. By doing so, the portion of the other clip leg 408 intruding into the channel space 608 and/or the grooved space 908 can be retracted out of the channel space 608 and/or the grooved space 908. The distance between the clip legs 408 can be equal to the release width 1116 when the connection device 102 is in the counterclockwise rotational configuration.

Figure 12:
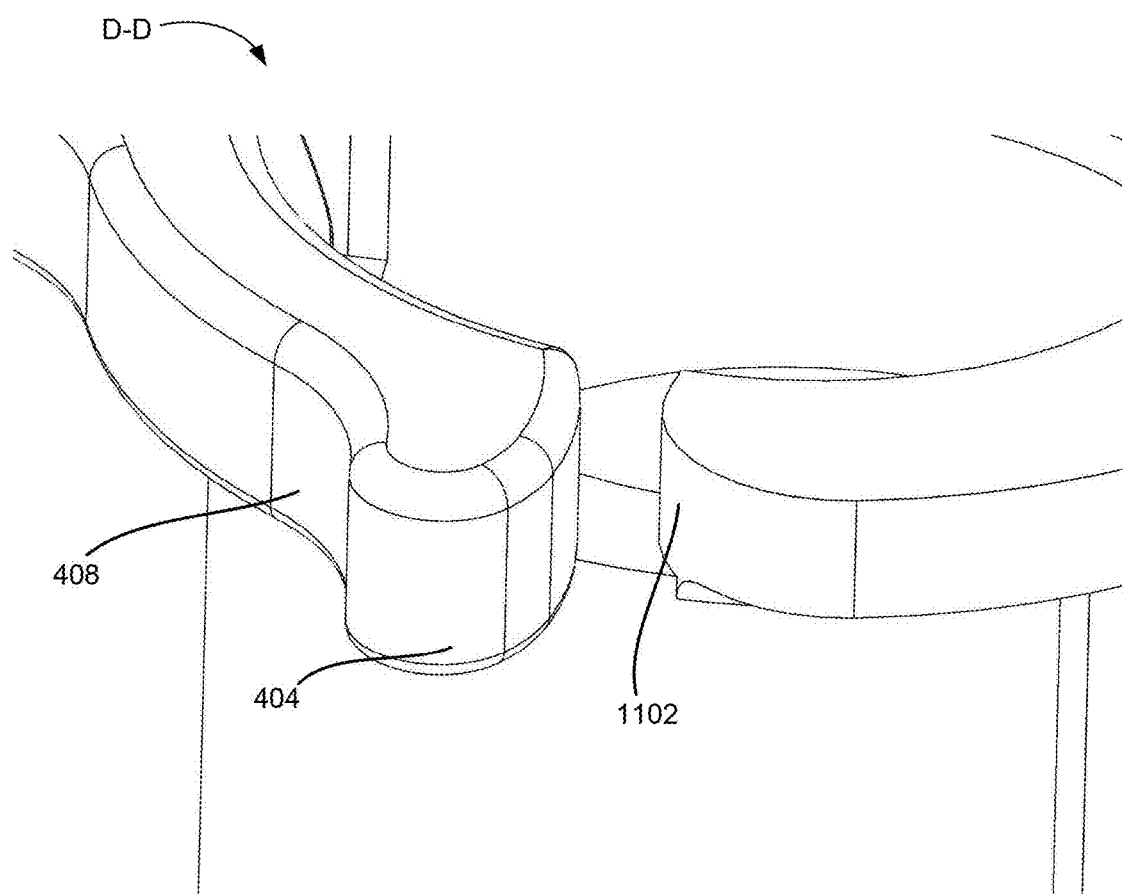
FIG. 12 is a close-up view of box D-D in FIG. 11E.

FIG. 12 illustrates a close-up of box DD of FIG. 11E. Box DD can illustrate a region of contact between the securing clip 202 and the channel wall 606. Box DD can illustrate a region of contact between the terminal end 404 of one of the clip legs 408 and the distal wall 1102. The channel wall 606, including the proximal wall 1100 of FIG. 11B and/or the distal wall 1102, can have a rounded surface, rounded edge, or a combination thereof.

The rounded surface, the rounded edge, or a combination thereof can, for example, allow the channel wall 606, including the proximal wall 1100, the distal wall 1102, or a combination thereof to act as a better fulcrum to pivot the clip legs 408. Moreover, the rounded surface and/or edge can apply less shear stress to the inner perimeter face 418 of the securing clip 202 and prevents undue stress to the clip legs 408 when the securing clip 202 is being deformed.

Figure 13:
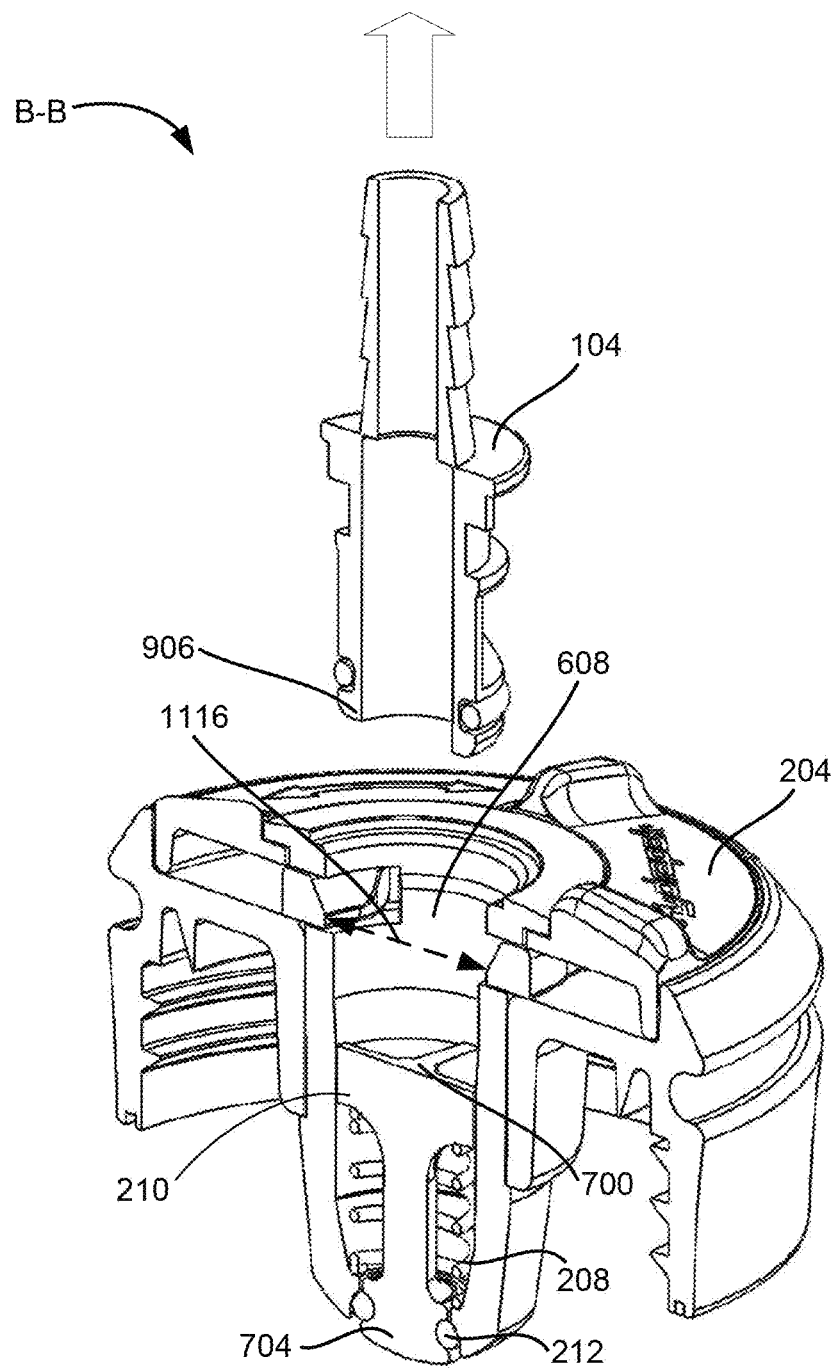
FIG. 13 is a variation of cross-section B-B of FIG. 10A in an exit configuration.

FIG. 13 illustrates the connection assembly 100 in an exit configuration. The exit configuration can refer to the adaptor 104 de-coupled and/or released from the connection device 102. The adaptor 104 can be longitudinally retracted from the channel space 608 when the dial 204 is rotated to the second position 1108 and the securing clip 202 is deformed into the release configuration. The dial 204 can be rotated in a clockwise direction, a counterclockwise direction, or a combination thereof to strain the securing clip 202 into the release configuration.

Once the adaptor 104 has been removed from the channel space 608, the spring 208 can release the compression energy stored in its compressed state and can push the poppet head 700 toward the first aperture 610. By doing so, the poppet plug 704 and the sealing ring 212 can be pushed back into the second aperture 612 and can once again occlude the second aperture 612.

Although not shown in the figures, it should be understood by one of ordinary skill in the art that the dial 204 can be rotated from the first position 1104 to the second position 1108 in order to, for example, allow the adaptor 104 to more easily enter the channel space 608. For example, rather than using the second adaptor end 906 to widen the distance between the clip legs 408 to the entry width 1002, the user can turn the dial 204 to the second position 1108 to more easily introduce the adaptor 104 into the channel space 608. The dial 204 can be rotated in the first angular direction 1106, the second angular direction 1118, or a combination thereof to more easily accommodate the entry of the adaptor 104 into the connection device 102.

Figure 14:
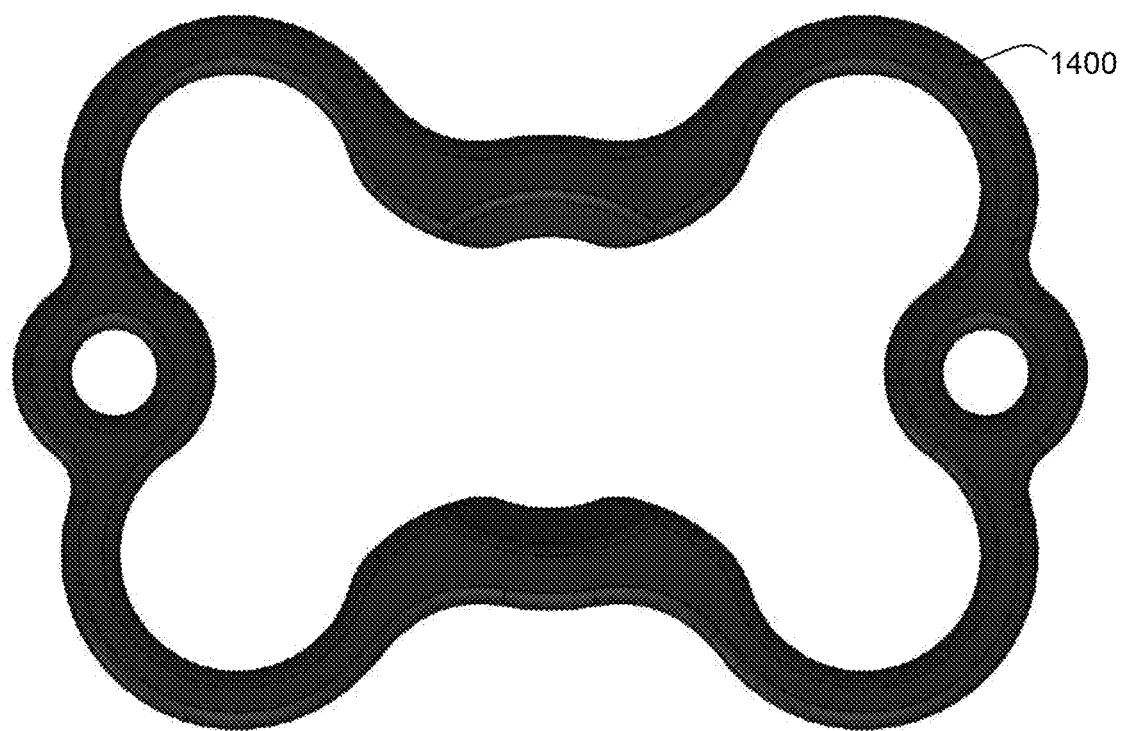
FIG. 14 is a top plan view of a variation of the securing, clip.

FIG. 14 illustrates a variation of a securing clip 1400. The securing clip 1400 can be shaped as a full dog-bone. The securing clip 1400 can be two instances of the securing clip 202 connected together by their clip legs 408. The securing clip 1400 can have two or more clip heads 406 each having their own receiving portion 416. In addition, the securing clip 1400 can have four or more clip shoulders 410.

The entire securing clip 1400 can be housed in the recess 214 of the receptor 200. In this variation, a portion of the securing clip 1400 can be located outside of the recess 214.

The second side 502 of the dial 204 can have an additional catch 512 configured to intrude into the receiving portion 416 of the second clip head 406. The bumpers 304 protruding from the recessed floor 302 can be repositioned to, for example, allow the securing clip 1400 to rotate in an angular direction along the recessed floor 302.

FIG. 15A is a side view of the connection assembly 100 coupled to a bottle 1500 and a fluid line 1502. FIG. 15B is a perspective view of the connection assembly 100 coupled to the bottle 1500.

The bottle 1500 can be a water bottle, a collapsible bottle, a squeeze bottle, a baby bottle, or a combination thereof. The bottle 1500 can be made of any material or substance safe for human contact and/or exposure. For example, the bottle 1500 can be made of a polymeric material including HDPE, LDPE, PP, PET, or a combination thereof, a metallic material such as stainless steel, or a composite thereof.

The connection device 102 of the connection assembly 100 can be removably attached to the bottle 1500 through the coupling structure 912 of FIG. 9B. The coupling structure 912 can include a thread coupling, a latch coupling, a plug coupling, or a combination thereof.

For example, a bottleneck of the bottle 1500 can have an insertion and/or male threading pattern and the inner side surface 914 of the receptor 200 of the connection device 102 can have a receiving and/or female threading pattern. While FIGS. 15A and 15B show the connection assembly 100 attached to the bottle 1500, it should be understood by one of ordinary skill in the art that the connection assembly 100 can be removably attached to a vessel and/or a channel configured to hold fluids and/or deliver fluids.

The fluid line 1502 can be coupled to the line engaging portion 900 of the adaptor 104. The fluid line 1502 can be composed of a flexible material, a rigid material, or a combination thereof. For example, the fluid line 1502 can be a hydration tube and/or a straw. The fluid line 1502 can be made of polyurethane, silicone rubber, a substance safe for human contact and/or exposure, or a combination thereof.

FIG. 16A illustrates that the connection device 102 can have a button window 1600. The button window 1600 can be a channel or opening extending radially inward from a circumferential surface or wall of the connection device 102. The button window 1600 can be formed or defined by one or more openings or gaps in the receptor 200, the dial 204, or a combination thereof. The button window 1600 can house or surround a side button 1602.

The side button 1602 can have a user interface portion 1604 and a clip expanding portion 1612 (see FIG. 16D). The clip expanding portion 1612 of the side button 1602 can deform or strain a securing clip 1606. The clip expanding portion 1612 can deform or strain the securing clip 1606 by increasing the distance between a pair of retractable clip legs 1608 (see FIG. 16C), displacing or translating a portion of the securing clip 1606, or a combination thereof. The clip expanding portion 1612 can deform or strain the securing clip 1606 when the side button 1602 is pushed or translated radially inward. The securing clip 1606 can be a variation of the securing clip 202 or the securing clip 1400.

FIG. 16B illustrates that the user interface portion 1604 of the securing clip 1606 can be flush with the outer side surface 306 of the receptor 200. In another variation, the user interface portion 1604 of the securing clip 1606 can be set inside or located within the button window 1600. FIG. 16B also illustrates that a portion of the securing clip 1606 can intrude into the channel space 608 of the connection device 102 when the side button 1602 is not pushed or translated radially inward.

FIG. 16C illustrates that the retractable clip legs 1608 of the securing clip 1606 can have a pair of separable clip feet 1610. The securing clip 1606 can be a substantially planar securing clip, a wire-type clip, or a combination thereof.

A portion of the securing clip 1606 can be located or disposed in the recess 214 of the receptor 200. The securing clip 1606 can have a head end 402 and a terminal end 404. The pair of separable clip feet 1610 can be at the terminal end 404 of the securing clip 1606. The pair of separable clip feet 1610 can be a terminus of the retractable clip legs 1608. The securing clip 1606 can be in the unbiased configuration when no force is applied to the user interface portion 1604 of the side button 1602.

FIG. 16C also illustrates that a portion of the securing, clip 1606 can intrude into the channel opening 216, the channel space 608, or a combination thereof when the securing clip 1606 is in the unbiased configuration.

FIG. 16D illustrates that the clip expanding portion 1612 of the side button 1602 can laterally separate the separable clip feet 1610 of the securing clip 1606. The clip expanding portion 1612 can separate the separable clip feet 1610 when the side button 1602 is translated or pushed radially inward. The side button 1602 can be translated or pushed radially inward when a user applies an inward pushing force to the user interface portion 1604 of the side button 1602.

The clip expanding portion 1612 can be a protrusion or surface feature of the side button 1602. The clip expanding portion 1612 can be triangular, conical, sloped, curved, or a combination thereof. The separable clip feet 1610 can have a receiving surface 1614. The receiving surface 1614 can be one or more surfaces of the separable clip feet 1610 configured to contact the clip expanding portion 1612 of the side button 1602. The receiving surface 1614 can have a shape complementary to the shape of the clip expanding portion 1612. For example, the receiving surface 1614 can be a sloped surface, a curved surface, concave surface, a convex surface, or a combination thereof.

The clip expanding portion 1612 can deform or strain the securing clip 1606 by increasing the lateral distance between the separable clip feet 1610. The clip expanding portion 1612 can deform or strain the securing clip 1606 when the side button 1602 and the clip expanding portion 1612 are translated or pushed radially inward.

FIG. 16D also illustrates that the user interface portion 1604 of the side button 1602 can extend beyond the outer side surface 306 of the receptor 200.

Figure 16E:
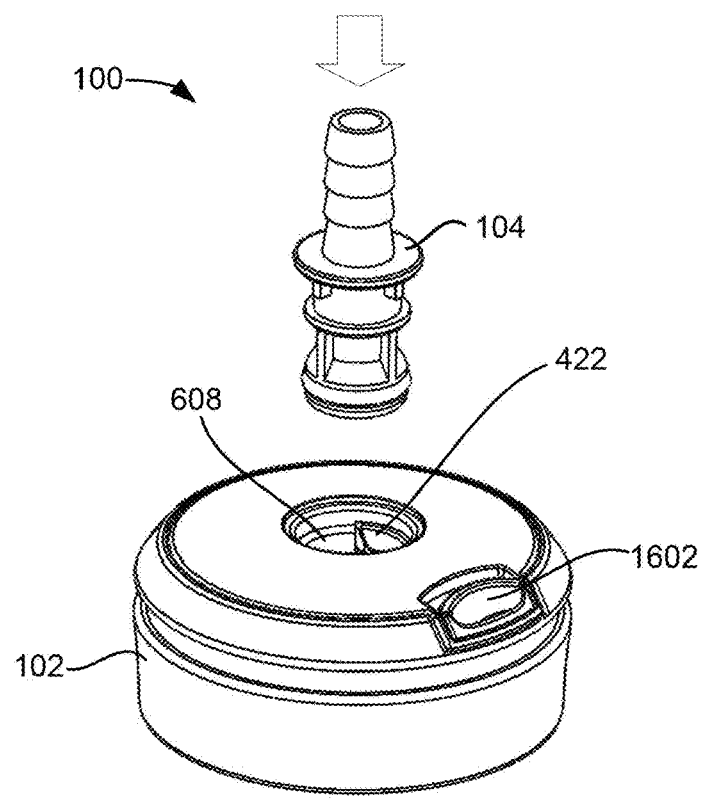
FIG. 16E is a perspective view of a variation of the connection assembly in an empty configuration.

FIG. 16E illustrates that the adaptor 104 can enter into the channel space 608 of the connection device 102 and increase the separation between the retractable clip legs 1608. The sloped face 422 of the securing clip 1606 can act as a ramp to accommodate and/or ease the entry of the adaptor 104 into the channel space 608.

In addition, a user can apply a radially inward force to the user interface portion 1604 of the side button 1602 to increase the distance between the separable clip feet 1610, the retractable clip legs 1608, or a combination thereof. Increasing the distance between the separable clip feet 1610, the retractable clip legs 1608, or a combination thereof can allow the adaptor 104 to more easily enter the channel space 608.

Figure 16F:
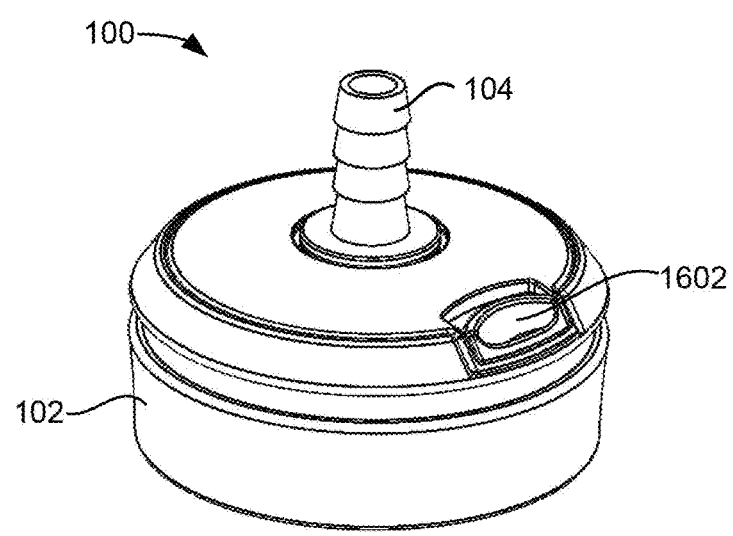
FIG. 16F is a perspective view of a variation of the connection assembly in a secured configuration.

FIG. 16F illustrates that the connection assembly 100 can be in the secured configuration when the adaptor 104 is secured by the retractable clip legs 1608 of the securing clip 1606. A user can remove the adaptor 104 from the connection device 102 by applying a radially inward force to the user interface portion 1604 of the side button 1602. The side button 1602 can then deform or strain the securing clip 1606 into the release configuration. The side button 1602 can deform or strain the securing clip 1606 into the release configuration when the clip expanding portion 1612 is pushed or translated radially inward to increase the distance between the separable clip feet 1610. Increasing the distance between the separable clip feet 1610 can, in turn, increase the distance between the retractable clip legs 1608.

The clip expanding portion 1612 can increase the distance between the retractable clip legs 1608 until at least a portion of the retractable clip legs 1608, including a portion of the sloped face 422, is retracted from the grooved space 908 of the adaptor 104. The adaptor 104 can be removed from the channel space 608 when at least a portion of the retractable clip legs 1608 is retracted from the grooved space 908 of the adaptor 104.

Figure 17A:
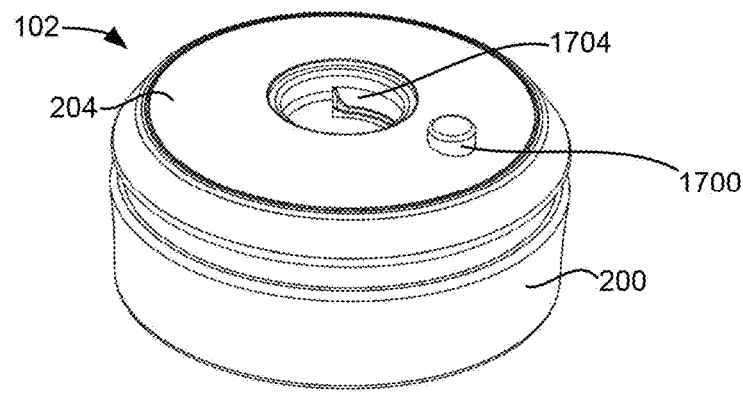
FIG. 17A is a perspective view of another variation of the connection device.

FIG. 17A illustrates that the connection device 102 can have a push button 1700. The push button 1700 can extend through a hole or opening in the dial 204. The push button 1700 can have a user interface portion 1702 and a clip expanding portion 1710 (see FIG. 17C). The clip expanding portion 1710 can deform or strain the securing clip 1704. The clip expanding portion 1710 can deform or strain the securing clip 1704 by increasing the distance between a pair of retractable clip legs 1706, displacing or translating a portion of the securing clip 1704, or a combination thereof. The clip expanding portion 1710 can deform or strain the securing clip 1704 when the push button 1700 is pushed or translated longitudinally into the recess 214 (see FIG. 17C) of the receptor 200. The securing clip 1704 can be a variation of the securing clip 202, the securing clip 1400, or the securing clip 1606.

Figure 17B:
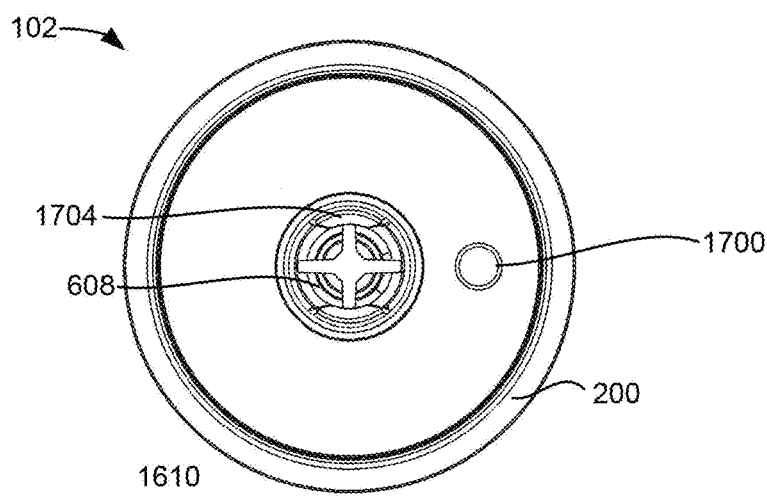
FIG. 17B is a top plan view of the connection device of FIG. 17A.

FIG. 17B illustrates that a portion of the securing clip 1704 can intrude into the channel space 608 of the connection device 102. For example, the sloped face 422 (see FIG. 17C) of the securing clip 1704 can intrude into the channel space 608 when no force is applied to the push button 1700.

Figure 17C:
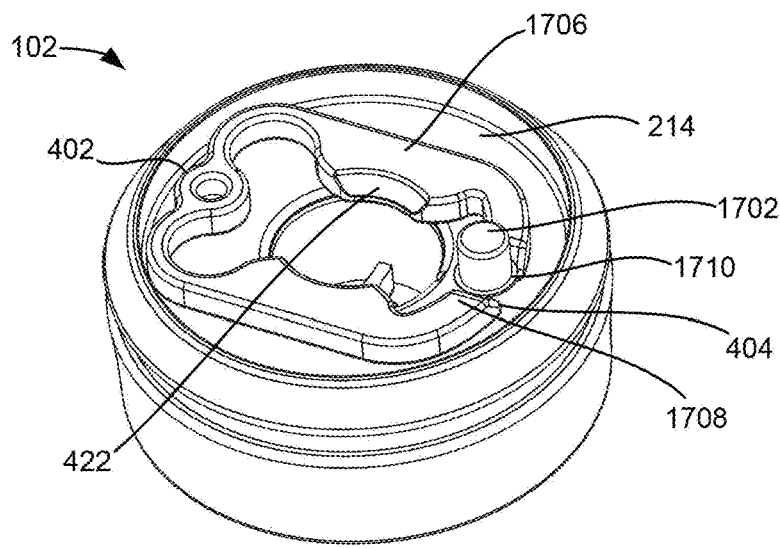
FIG. 17C is a perspective view of a variation of the connection device of FIG. 17A with the dial and channel nozzle removed.

FIG. 17C illustrates that the retractable clip legs 1706 can have a pair of separable clip feet 1708. The securing clip 1704 can be a substantially planar securing clip, a wire-type clip, or a combination thereof.

A portion of the securing clip 1704 can be located or disposed in the recess 214 of the receptor 200. The securing clip 1704 can have a head end 402 and a terminal end 404. The pair of separable clip feet 1708 can be at the terminal end 404 of the securing clip 1704. A portion of the push button 1700 can contact or abut the terminal end 404 of the securing clip 1704, the separable clip feet 1708, or a combination thereof. The securing clip 1704 can be in the unbiased configuration when no force is applied to the user interface portion 1702 of the push button 1700.

The clip expanding portion 1710 can laterally separate the separable clip feet 1708 of the securing clip 1704. The clip expanding portion 1710 can separate the separable clip feet 1708 when the push button 1700 is translated or pushed longitudinally into the recess 214. The push button 1700 can be translated or pushed longitudinally into the recess 214 when a user applies a pressing longitudinal force to the user interface portion 1702 of the push button 1700.

Figure 17D:
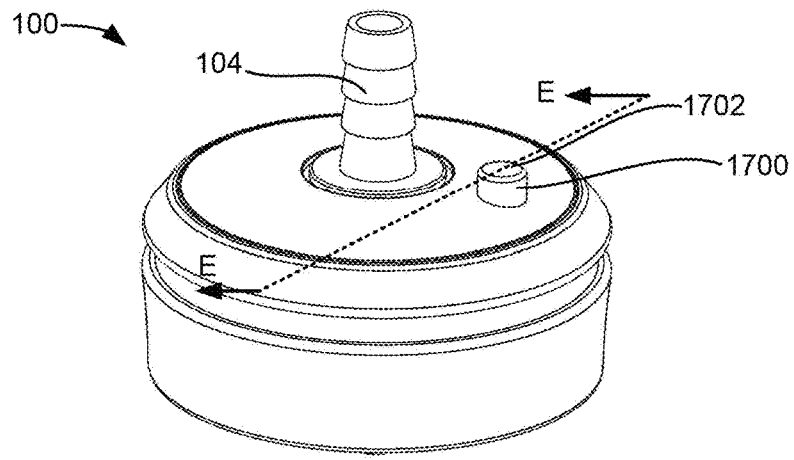
FIG. 17D is a perspective view of a variation of the connection assembly in a secured configuration.

FIG. 17D illustrates that the connection assembly 100 can be in the secured configuration when the adaptor 104 is secured by the retractable clip legs 1706 of the securing clip 1704. The adaptor 104 can be secured by the securing clip 1704 when a portion of each of the retractable clip legs 1706 intrudes into the grooved space 908 (see FIG. 9B) of the adaptor 104 along the receptor engaging portion 902 (see FIG. 9A). The adaptor 104 can be secured by the retractable clip legs 1706 when no force is applied to the user interface portion 1702 of the push button 1700 and the retractable clip legs 1706.

Figure 17E:
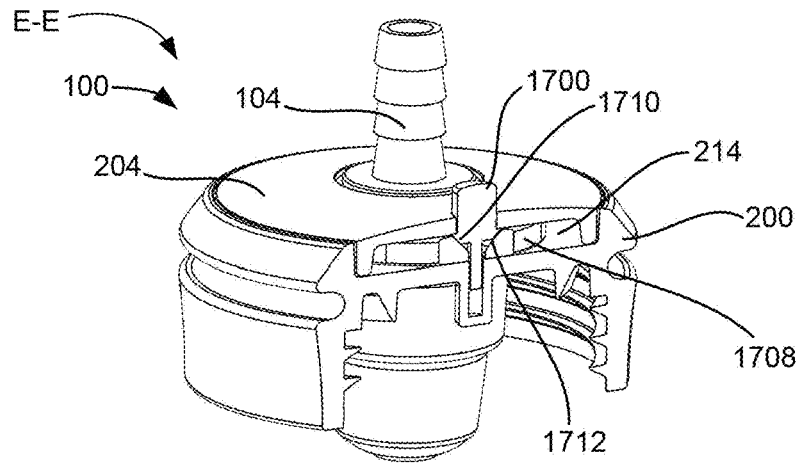
FIG. 17E is a variation of cross-section E-E of FIG. 17D in the secured configuration.

FIG. 17E illustrates that the inner perimeter face of the separable clip feet 1708 can have a receiving surface 1712. The receiving surface 1712 can be a portion of the separable clip feet 1708 having a surface feature or shape. The surface feature or shape can be a surface concavity, a slope, a radially converging portion, or a combination thereof.

FIG. 17E also illustrates that the clip expanding portion 1710 can have a shape or surface feature complementary to the receiving surface 1712 of the securing clip 1704. For example, the receiving surface 1712 can have a slope such as the slope 1000 of FIG. 10B. In this example, the clip expanding portion 1710 can have a surface feature complementary to the slope. The clip expanding portion 1710 can be triangular, conical, frustoconical, curved, round, sloped, or a combination thereof.

The receiving surface 1712 can act as a ramp to accommodate and/or ease the translation or movement of the push button 1700 longitudinally into the recess 214, the receptor 200, or a combination thereof. The clip expanding portion 1710 can increase the lateral distance between the separable clip feet 1708 and, in turn, the retractable clip legs 1706 by physically lodging or wedging in between the pair of separable clip feet 1708.

The push button 1700 can expand the securing clip 1704 into the release configuration when at least a portion of the sloped face 422 of the securing clip 1704 is retracted from the channel opening 216, the channel space 608, the grooved space 908, or a combination thereof.

Figure 17F:
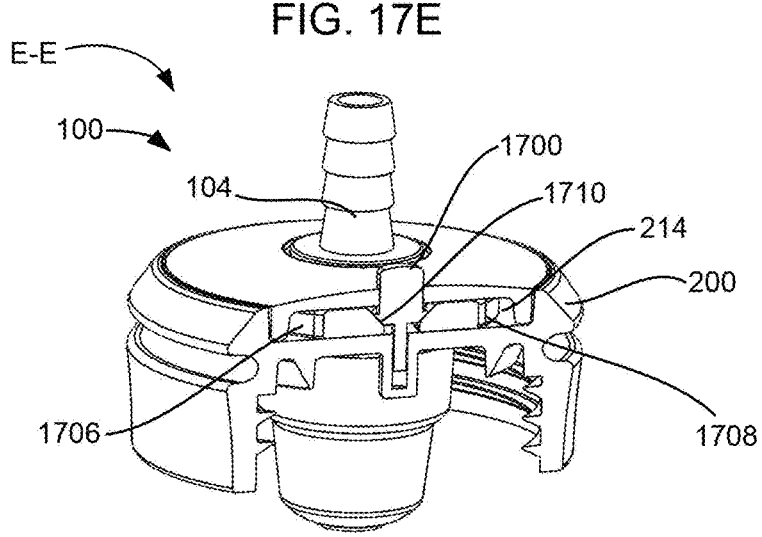
FIG. 17F is a variation of cross-section E-E of FIG. 17D in the release configuration.

FIG. 17F illustrates that the adaptor 104 can be removed from the channel space 608 of the connection device 102 when the clip expanding portion 1710 of the push button 1700 has strained or deformed the securing clip 1704 into the release configuration. The clip expanding portion 1710 of the push button 1700 can strain or deform the securing clip 1704 into the release configuration when the portion of the retractable clip legs 1706 intruding into the channel space 608 of the connection device 102, the grooved space 908 of the adaptor 104, or a combination thereof has been retracted from the channel space 608, the grooved space 908, or a combination thereof.

When a force is no longer applied to the user interface portion 1702 of the push button 1700, the retractable clip legs 1706 can retract back to their original shape and the retracting force of the retractable clip legs 1706 can return the push button 1700 back to its original position. The retractable clip legs 1706 can return the push button 1700 back to its original position by translating at least a portion of the push button 1700 in a longitudinal direction out of the recess 214, the receptor 200, or a combination thereof.

It is apparent to one skilled in the art that various changes and modifications can be made to this disclosure, and equivalents employed, without departing from the spirit and scope of the invention. Elements of systems, devices and methods shown with any embodiment are exemplary for the specific embodiment and can be used in combination or otherwise on other embodiments within this disclosure.

We claim:

1. A connection device comprising:
a receptor having a recess;
a securing clip at least partially inside the recess and comprising a clip head and a pair of clip legs connected to the clip head,
wherein the clip head has a receiving portion defined on a surface of the clip head,
wherein a portion of each of the pair of clip legs intrudes into a channel space of the connection device when the securing clip is in an unbiased configuration; and
a dial comprising a first side and a second side,
wherein the dial comprises a catch,
wherein the catch is configured to intrude into the receiving portion, and
wherein the dial is configured to strain the securing clip into a release configuration when the dial is rotated in a first angular direction.

2. The device of claim 1, wherein the catch protrudes from the second side of the dial, wherein the second side is directly under the first side of the dial.

3. The device of claim 1, wherein the receiving portion is a cavity defined on the surface of the clip head facing the second side of the dial.

4. The device of claim 1, wherein the dial has a first position when the securing clip is in the unbiased configuration and a second position when the securing clip is in the release configuration,
wherein the dial is rotated, without lifting the dial, from the first position to the second position by a dial angle when the securing clip is in the release configuration, and
wherein the dial angle is between 10 degrees and 45 degrees.

5. The device of claim 1, wherein the receptor is configured to attach to a bottle through a coupling structure.

6. The device of claim 1, wherein the dial is configured to strain the securing clip into the release configuration when the dial is rotated in a second angular direction.

7. The device of claim 1, further comprising a poppet, wherein the poppet occludes an aperture of the connection device when the receptor is in an empty configuration.

8. The device of claim 1, wherein the first side of the dial comprises one or more ridges extending in a radial direction from a perimeter of the dial toward a center of the dial.

9. The device of claim 1, wherein an inner perimeter face of each of the pair of clip legs comprises a sloped face.

10. The device of claim 1, further comprising a stop protruding from the second side and a bumper protruding from the recess.

11. The device of claim 1, further comprising a channel nozzle of the connection device,
wherein the channel nozzle has channel slots, and
wherein the portion of each of the pair of clip legs intrudes into the channel space through the channel slots.

12. The device of claim 1, further comprising an adaptor having a grooved space and wherein the adaptor is secured by the securing clip when a portion of each of the pair of clip legs intrudes into the grooved space.

13. A connection device comprising:
a receptor having a recess;
a securing clip at least partially inside the recess and comprising a clip head, wherein the clip head has a receiving portion; and
a dial comprising a first side and a second side,
wherein the dial comprises a catch,
wherein the catch is configured to intrude into the receiving portion of the clip head,
wherein at least part of the dial is inside the recess,
wherein the dial is radially surrounded by the receptor, and
wherein the dial is configured to strain the securing clip into a release configuration when the dial is rotated in a first angular direction.

14. The device of claim 13, wherein the catch protrudes from the second side of the dial, wherein the second side is directly under the first side of the dial.

15. The device of claim 13, wherein the receiving portion is a cavity defined on the surface of the clip head facing the second side of the dial.

16. The device of claim 13, wherein the dial has a first position when the securing clip is in the unbiased configuration and a second position when the securing clip is in the release configuration,
wherein the dial is rotated, without lifting the dial, from the first position to the second position by a dial angle when the securing clip is in the release configuration, and
wherein the dial angle is between 10 degrees and 45 degrees.

17. The device of claim 13, wherein the receptor is configured to attach to a bottle through a coupling structure.

18. The device of claim 13, wherein the dial is configured to strain the securing clip into the release configuration when the dial is rotated in a second angular direction.

19. The device of claim 13, further comprising a poppet, wherein the poppet occludes an aperture of the connection device when the receptor is in an empty configuration.

20. The device of claim 13, wherein the first side of the dial comprises one or more ridges extending in a radial direction from a perimeter of the dial toward a center of the dial.

* * * * *